(12) United States Patent
Fan et al.

(10) Patent No.: US 11,405,909 B2
(45) Date of Patent: Aug. 2, 2022

(54) DOWNLINK CONTROL INFORMATION PIGGYBACK IN PHYSICAL DOWNLINK SHARED CHANNEL, DOWNLINK CONTROL INFORMATION ENCODING

(71) Applicant: QUALCOMM Incorporated, San Diego, CA (US)

(72) Inventors: Zhifei Fan, San Diego, CA (US); Jing Sun, San Diego, CA (US); Xiaoxia Zhang, San Diego, CA (US); Tao Luo, San Diego, CA (US); Srinivas Yerramalli, San Diego, CA (US); Wooseok Nam, San Diego, CA (US); Sungwoo Park, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/868,330

(22) Filed: May 6, 2020

(65) Prior Publication Data

US 2021/0352631 A1    Nov. 11, 2021

(51) Int. Cl.
| | | |
|---|---|---|
| H04W 72/04 | (2009.01) |
| H04W 76/11 | (2018.01) |
| H04B 7/06 | (2006.01) |
| H04L 1/00 | (2006.01) |
| H04L 5/00 | (2006.01) |
| H04L 25/02 | (2006.01) |

(52) U.S. Cl.
CPC ........ *H04W 72/042* (2013.01); *H04B 7/0626* (2013.01); *H04L 1/0061* (2013.01); *H04L 5/0051* (2013.01); *H04L 25/0226* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2016/0100382 A1* | 4/2016 | He ........................ | H04L 5/001 370/329 |
| 2018/0123769 A1* | 5/2018 | Pelletier ............... | H04L 5/0094 |
| 2018/0124753 A1* | 5/2018 | Sun ...................... | H04W 72/042 |
| 2019/0393987 A1* | 12/2019 | Hong .................... | H04L 1/0072 |
| 2020/0067530 A1* | 2/2020 | Xu ........................ | H03M 13/13 |
| 2020/0374881 A1* | 11/2020 | Kwak ................... | H04L 1/0061 |

(Continued)

OTHER PUBLICATIONS

International Search Report and Written Opinion—PCT/US2021/025247—ISA/EPO—dated Jul. 12, 2021.

(Continued)

*Primary Examiner* — Otis L Thompson, Jr.
(74) *Attorney, Agent, or Firm* — Procopio, Cory, Hargreaves & Savitch LLP

(57) ABSTRACT

A base station transmits a first downlink control information (DCI) portion in a physical downlink control channel (PDCCH), wherein the first DCI portion indicates a second DCI portion. The base station jointly encodes multiple component DCIs, each of the component DCIs providing a resource allocation in combination with the first DCI portion. The apparatus transmits the second DCI portion comprising the jointly encoded multiple component DCIs in a physical downlink shared channel (PDSCH).

39 Claims, 15 Drawing Sheets

(56) References Cited

U.S. PATENT DOCUMENTS

2020/0396760 A1* 12/2020 Yi ..................... H04W 72/042
2020/0404617 A1* 12/2020 Murray ............. H04W 52/0229
2021/0184798 A1*  6/2021 Park .................... H04L 1/0003

OTHER PUBLICATIONS

Qualcomm et al., "WF on 2-Stage DCI for NR", 3GPP Draft, 3GPP TSG RAN WG1 NR Ad-hoc, R1-1701478 WF on 2-Stage DCI for NR, 3RD Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017 Jan. 20, 2017 (Jan. 20, 2017), XP051222474, pp. 1-3, Retrieved from the Internet: URL:http://www.3gpp.org/ftp/tsg_ran/WG1_RL1/TSGR1_AH/NR_AH_1701/Docs/ [retrieved on Jan. 20, 2017] the whole document.

* cited by examiner

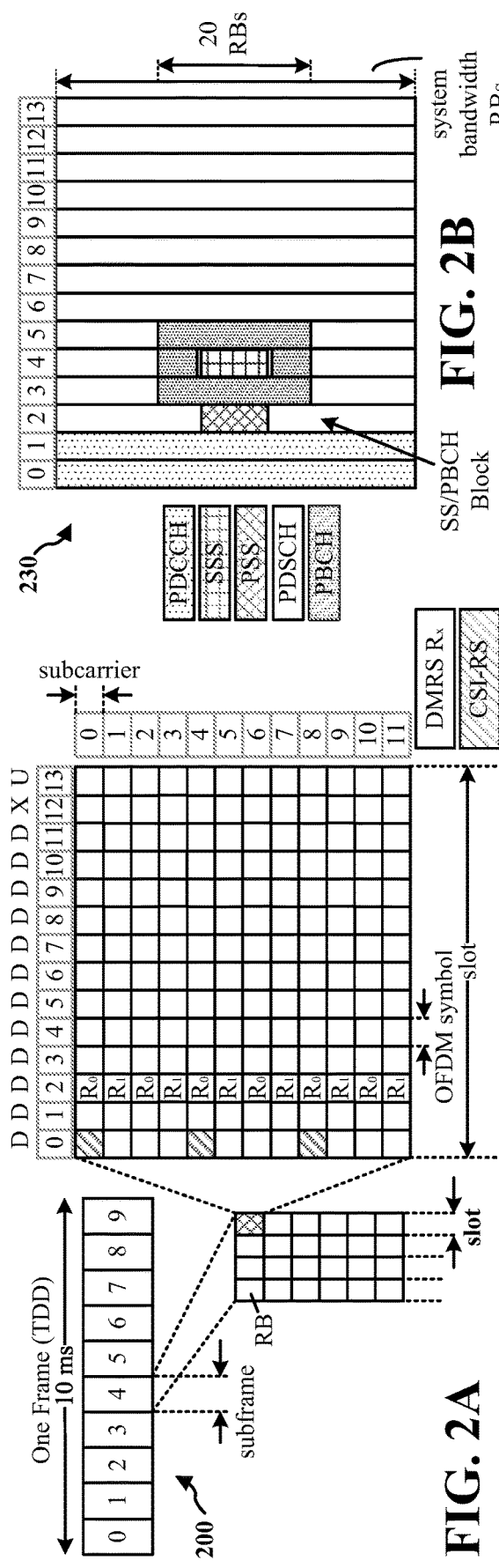
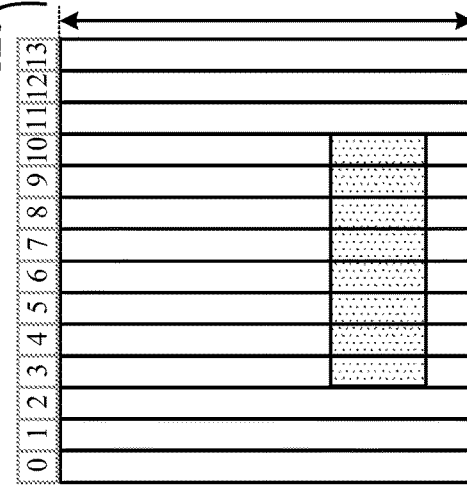
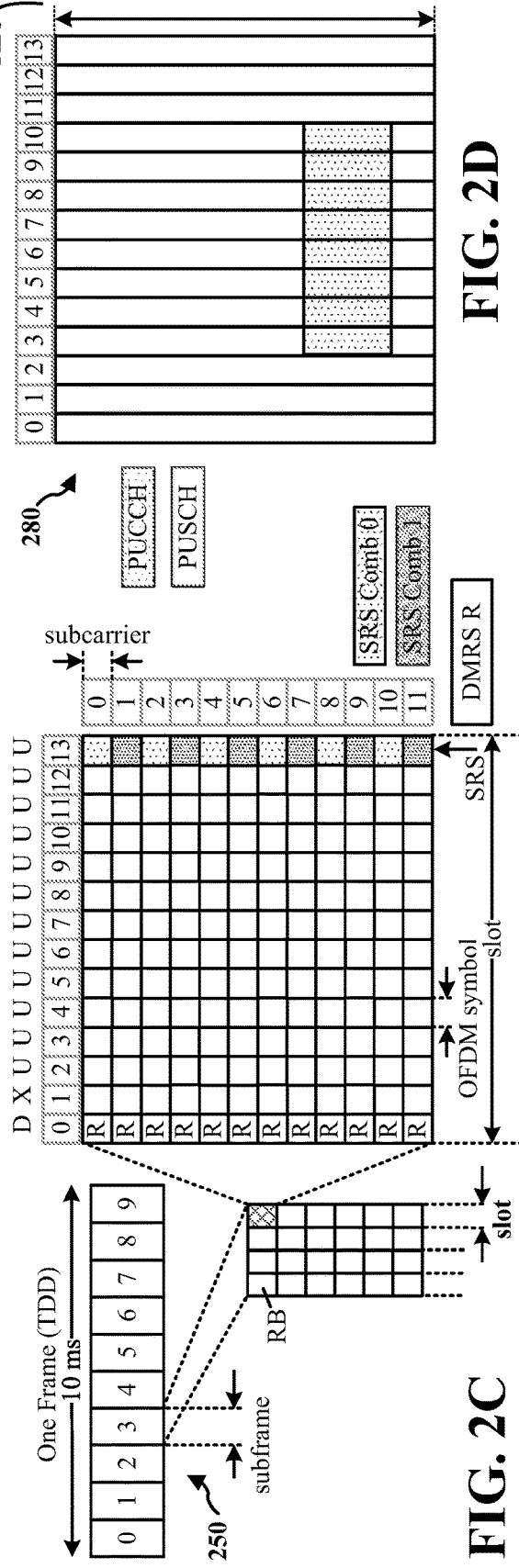
FIG. 2A
FIG. 2B
FIG. 2C
FIG. 2D

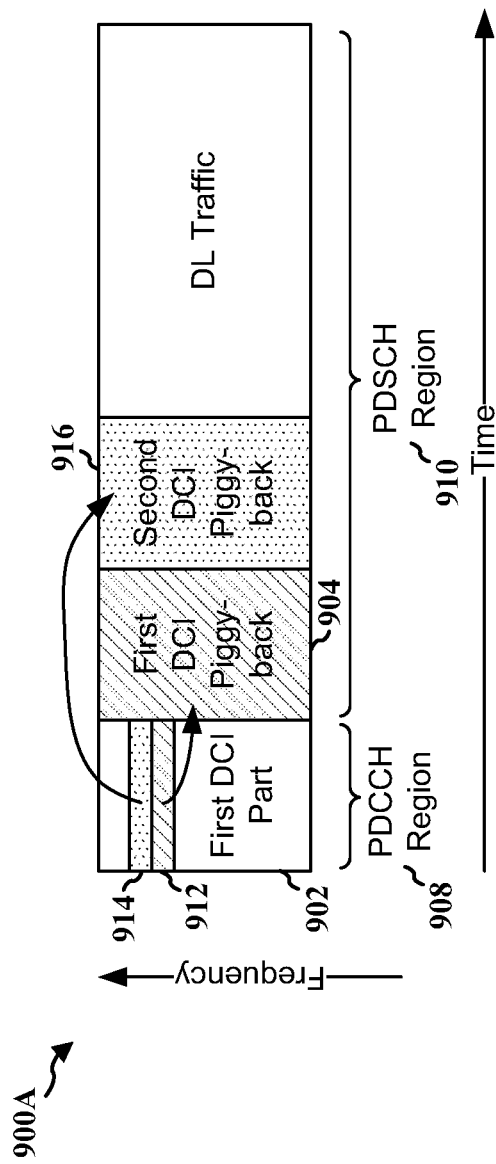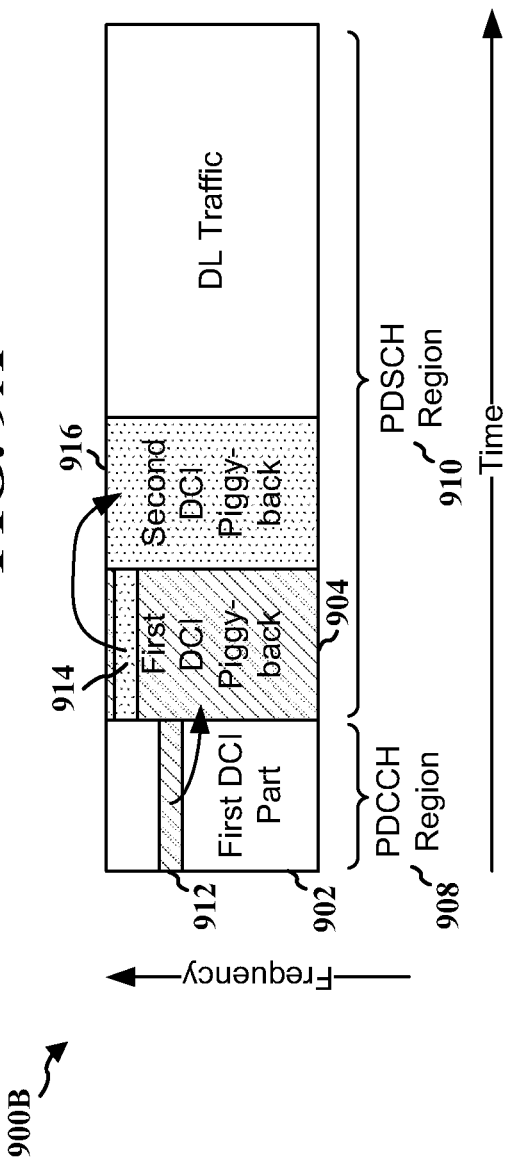
FIG. 9A
FIG. 9B

DOWNLINK CONTROL INFORMATION PIGGYBACK IN PHYSICAL DOWNLINK SHARED CHANNEL, DOWNLINK CONTROL INFORMATION ENCODING

BACKGROUND

Technical Field

The present disclosure relates generally to communication systems, and more particularly, to wireless communication including downlink control information.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus transmits a first downlink control information (DCI) portion in a physical downlink control channel (PDCCH), wherein the first DCI portion indicates a second DCI portion. The apparatus jointly encodes multiple component DCIs, each of the component DCIs providing a resource allocation in combination with the first DCI portion. The apparatus transmits the second DCI portion comprising the jointly encoded multiple component DCIs in a physical downlink shared channel (PDSCH).

In an aspect of the disclosure, a method, a computer-readable medium, and an apparatus are provided for wireless communication at a user equipment (UE). The apparatus receives a first DCI portion in a PDCCH. The apparatus receives a second DCI portion comprising jointly encoded multiple component DCIs in a PDSCH, each of the component DCIs providing a resource allocation in combination with the first DCI portion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 9A and 9B are diagrams illustrating examples of transmitting DCI in multiple parts.

DETAILED DESCRIPTION

Figure 1:
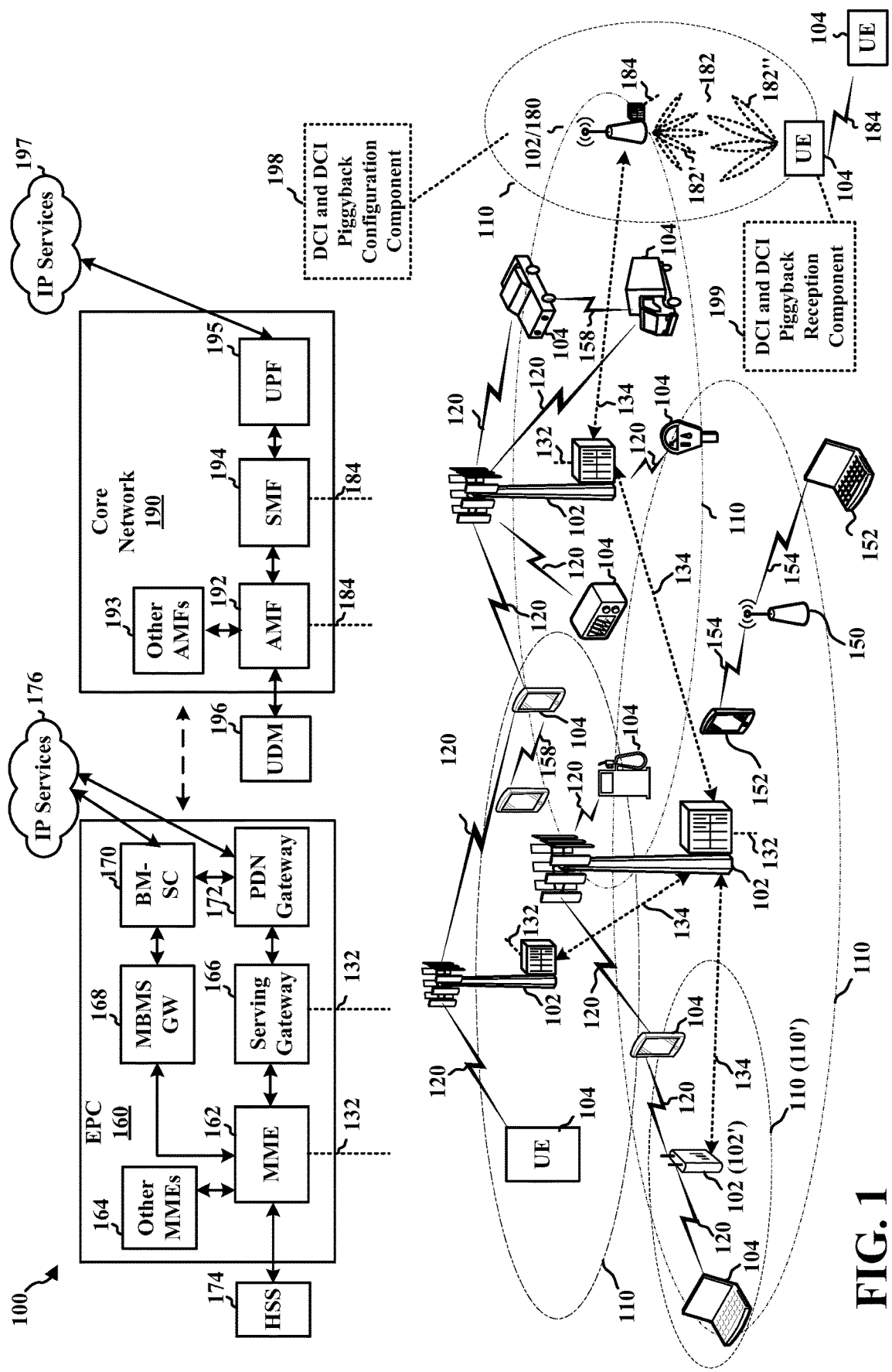
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A grant may be indicated to a UE in multiple parts. A first part of the grant may be transmitted in a physical downlink control channel (PDCCH) region, and a second portion of the grant may be transmitted in a physical downlink shared channel (PDSCH) region. The inclusion of the second portion of the grant may be referred to as piggybacking the downlink control information (DCI) with the PDSCH. The DCI piggyback design may reduce a UE's needs to perform PDCCH blind decoding, so the UE may process the PDCCH more quickly. For example, there may be fewer DCIs in a PDCCH region when a DCI piggyback design is used, because other DCIs may be transmitted in the PDSCH region. Thus, there may be less PDCCHs for the UE to decode. In addition, the DCI piggyback may share the same beam for transmitting the PDSCH, such as having a QCL relation with the PDSCH. This may improve the efficiency of the transmission as the beam used for PDSCH may be narrower than the beam used for PDCCH. Aspects presented herein may further improve the efficiency of DCI piggyback in the PDSCH. In one example, multiple component DCIs may be piggybacked in the PDSCH region, and the DCI in the PDCCH region may be used to provide information related to the DCI piggyback and the multiple component DCIs. Each component DCI may carry resource allocation information in combination with the DCI in the PDCCH region.

FIG. 1 is a diagram illustrating an example of a wireless communications system and an access network 100. In certain aspects, the base station 102 or 180 may include a DCI and DCI Piggyback Configuration Component 198 configured to split DCI into multiple parts. A first DCI part may be transmitted within the PDCCH region and a second DCI part, which may be referred to as a DCI piggyback, may be transmitted within the PDSCH. The first DCI part may include initial control information, and it may also include piggyback control information about the second DCI part. The second DCI part may include multiple component DCIs, and each component DCI may comprise remaining control information regarding the downlink assignment. For example, a base station may be configured to transmit a first DCI portion in a PDCCH, jointly encode multiple component DCIs, each of the component DCIs providing a resource allocation in combination with the first DCI portion, and transmit a second DCI portion comprising the jointly encoded multiple component DCIs in a PDSCH.

The UE 104 may include a DCI and DCI Piggyback Reception Component 199 configured to receive multiple DCIs and multiple component DCIs in PDCCH and PDSCH. For example, the UE may receive the first DCI portion in a PDCCH, and the UE may receive the second DCI portion comprising jointly encoded multiple component DCIs in a PDSCH, where each of the component DCIs may provide a resource allocation in combination with the first DCI portion.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 602.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
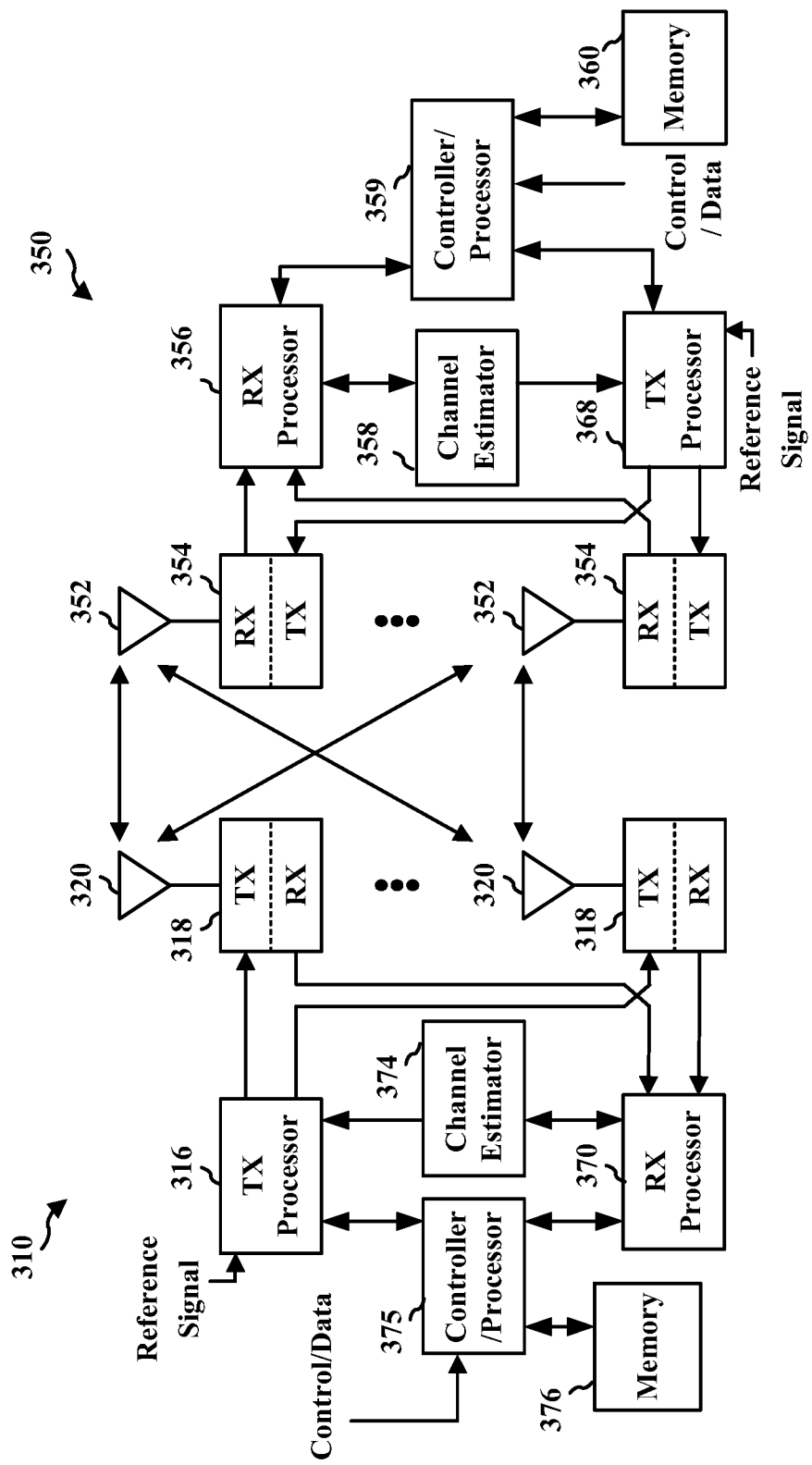
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. least one of the TX processor 316, the RX processor 370, and the controller/processor 375 may be configured to perform aspects in connection with 199 of FIG. 1.

As noted above, a grant may be indicated to a UE in multiple parts. A first part may be transmitted in a PDCCH region, and a second part may be transmitted in a PDSCH region. As described herein, multiple DCI components may be indicated in the second part. Therefore, multiple downlink/uplink grants may be indicated through a combination of the first part indicated in the PDCCH region and the multiple DCI components included (e.g., piggybacked) in the PDSCH region. For example, the first DCI part in the PDCCH may grant resource allocation for a UE in a PDSCH, and the first DCI part may also indicate to the UE that there is a second DCI part or more (e.g., DCI piggyback) in the PDSCH. The second DCI part may include multiple component DCIs jointly encoded by the base station, and these multiple component DCIs may grant other resources, signaling and/or information (e.g., additional PDSCH, PUSCH, CSI-RS, SRS, etc.) to the UE which may be unrelated to the resources granted in the first DCI part. The DCI within the PDCCH may provide downlink resource assignments and/or uplink resource grants for one or more scheduled entities. Multiple PDCCHs may be transmitted in each slot and each PDCCH may carry user-specific DCI or common DCI (e.g., control information broadcast to a group of scheduled entities). Each DCI may further include a cyclic redundancy check (CRC) bit that is scrambled with a radio network temporary identifier (RNTI), which may be a specific user RNTI or a group RNTI, to allow the scheduled entity to determine the type of control information sent in the PDCCH.

Figure 4:
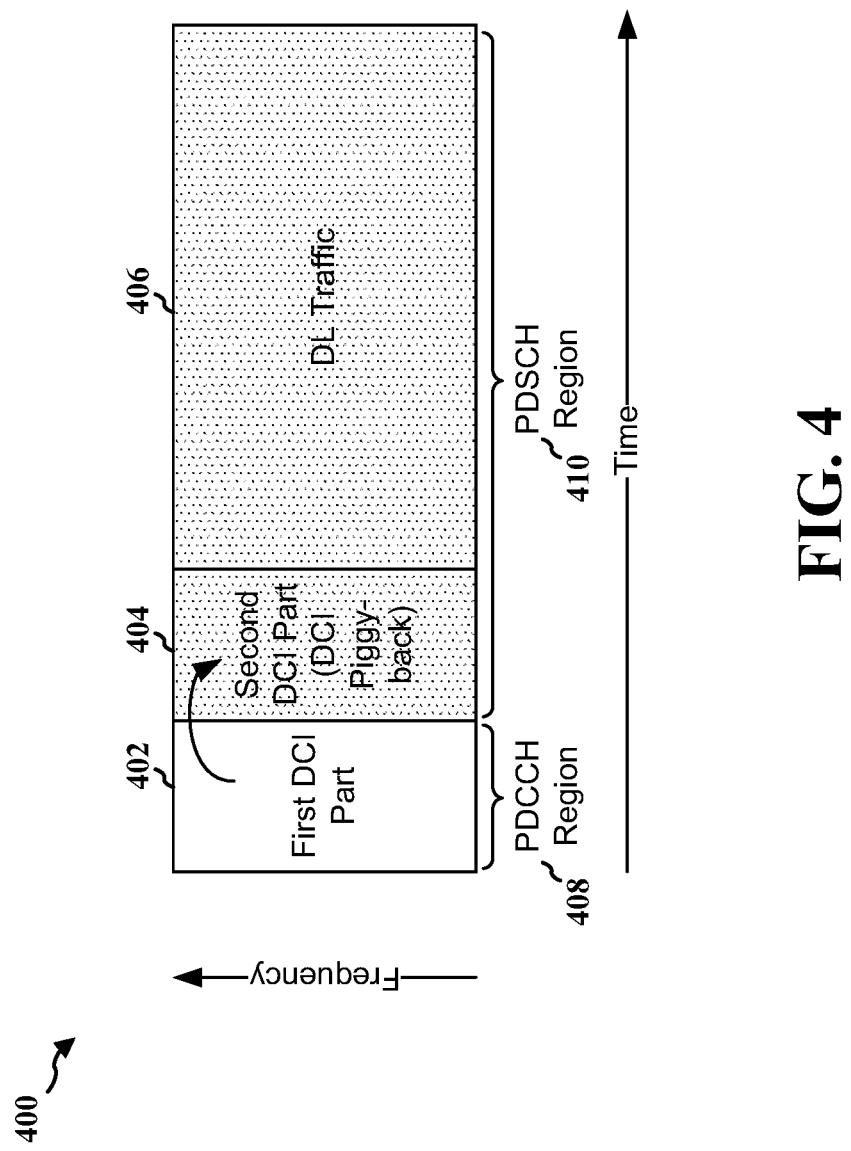
FIG. 4 is a diagram illustrating an example of transmitting DCI in multiple parts.

FIG. 4 is a diagram 400 illustrating an example of a 2-stage PDCCH, such as a DM-RS-based PDDCH (D-PDCCH). To reduce control overhead and to improve the processing timeline, DCI used for DL grant(s) may split into two parts or more. A first DCI part 402 may be transmitted within the control region (e.g., the PDCCH region 408) and a second DCI part 404, which may be referred to as a DCI piggyback, may be transmitted within the downlink traffic region (e.g., the PDSCH region 410). The PDCCH region 408 and the PDSCH region 410 may together form one slot. The first DCI part 402 may include initial control information regarding a downlink assignment, such as the resource assignment (RA), rank and modulation order of the downlink assignment. In addition, the first DCI part 402 may also include piggyback control information about the second DCI part 404. In some examples, the piggyback control information may indicate the number of resource elements (size) and code rate of the second DCI part 404. The piggyback control information may further indicate the location (e.g., starting resource element) and code rate of the second DCI part 404. In some examples, a plurality of second DCI part formats may be maintained, where each format indicates a size and code rate of the second DCI part 404. The first DCI part 402 may be configured with semi-persistent scheduling (SPS), so that a UE may be RRC configured to receive the second DCI part 404 and the relevant DL traffic 406 in the PDSCH region 410.

The second DCI part 404 may include the remaining control information regarding the downlink assignment. For example, the remaining control information may include non-time critical control information, such as the HARQ process ID, redundancy version ID, a new data indicator, transmit power control indicator, channel quality indicator request, sounding reference signal request, or downlink assignment index, etc. The second DCI part 404 may be transmitted in the PDSCH region 410 within the RA allocated with the PDSCH rank and modulation order, it may also share the DMRS for the demodulation of data and/or other DCI(s). In addition, the second DCI part 404 may also include other DCIs, such as other uplink and/or downlink grants. The second DCI part 404 may also support multi-users, where a group RNTI may be included in the first DCI part 402 and an addressing may be included in the second DCI part 404 so that different UEs may receive (e.g., pick up) their respective transmissions in the downlink Traffic 406 of the PDSCH region 410.

By splitting DCI into two parts, better and more flexible timeline for transmissions may be configured for the UE and/or the base station. For example, a base station may transmit HARQ related information in the second DCI part 404, which provides the base station with a more relaxed timeline to generate the information as the base station is not limited to put all information in one DCI (e.g., the first DCI part 402 or within the PDCCH region 408), which may have a very short duration. The base station may then have more time to prepare a payload that is corresponding to the PDCCH. The DCI splitting may also provide more efficient delivery of the information because rank and modulation order of PDSCH may be used. The PDDCH (e.g., the second DCI part 404) may also be transmitted in the same way as the PDSCH region 410.

In some network, the network may support the use of bandwidth parts (BWPs), where a BWP may be a contiguous set of PRBs on a given component carrier (CC). Data and control channels may be received and/or transmitted within the BWP. A BWP may be configured with various parameters which may include numerology, frequency location, bandwidth size, and/or control resource set (CORESET). A CORESET may be a set of physical resources within a specific area in a downlink resource grid that is used to carry PDCCH DCI.

A UE may perform blind decoding for a set of PDCCH candidates delivered in the CORESET to identify the DCI targeting the UE, where PDCCH candidates to be monitored may be configured for the UE by search space (SS) sets. For example, there may be a common SS set that is generally monitored by a group of UEs in a cell, and there may be a UE-specific SS set that is monitored by a specific UE. A UE may be configured with multiple SS sets. Each SS set may be associated with a CORESET. As described in connection with FIG. 1, some communication between a base station 102/180 and a UE 104 may be based on directional beamformed transmission and reception using a large number of antennas between the base station and the UE (e.g., beamforming 182). In some examples, the PDCCH may be sent by the base station with wider beam or the same size beam compared to the beam that the base station uses to transmit the PDSCH. The blind decoding mechanism for the PDCCH enables multiple UEs to be served with a PDCCH at the same time. The mechanism may also reduce blockings between UEs by randomly hashing locations of the PDCCH for different UEs differently in the CORESET.

For a network that is operating in mmW frequencies and/or near mmW frequencies (e.g., FR2), due to the analog beam transmission restriction and short slots duration in time domain (e.g., resulted from subcarrier spacing scaling up), the likelihood of configuring a base station to send multiple DCIs to different UEs may be less likely comparing to a network that is operating at a lower frequency band (e.g., FR1). For example, with higher scaling of subcarrier spacing, the length of a symbol or a slot may relatively be very short. As different UEs may be using different analog beams, the base station may require additional time to switch beams in the time domain. As such, the network operating at FR2 may be more likely to configure a base station to send multiple downlink and/or uplink grants to a UE, such as to handle relatively long, bursty downlink and/or uplink traffic.

The aforementioned DCI piggyback (e.g., splitting DCI into parts and including the second part in the PDSCH) mechanism may be applied to a network operating at or near mmW frequencies (e.g., FR2), where the DCI piggyback design may be very useful in mmW transmissions or cases. Using a DCI piggyback may reduce a UE's needs to perform PDCCH blind decoding, so the UE may process the PDCCH faster. For example, there may be fewer DCIs in a PDCCH region under DCI piggyback design as other DCIs may be transmitted in the data region (e.g., PDSCH region). Thus, there may be less PDCCHs for the UE to decode. In addition, the DCI piggyback (e.g., second DCI part 404) may share the same beam for transmitting the PDSCH, such as having a Quasi Co-Location (QCL) relation with the PDSCH. This may improve the efficiency of the transmission as the beam used for PDSCH may be narrower than the beam used for PDCCH.

Aspects presented herein may further improve the efficiency and usage of DCI piggyback in PDSCH. In one example, a DCI piggyback (e.g., the second DCI part in the PDSCH region) may include multiple component DCIs (e.g., DCIs with multiple UL and/or DL grants), and the first DCI part (e.g., in the PDCCH region) may be used to provide information related to these multiple component DCIs in the DCI piggyback. Thus, a DCI piggyback carrying multiple component DCIs may contain information of one or more DCIs. Each component DCI may carry resource allocation information in combination with the DCI in the PDCCH region (e.g., the first DCI part).

Figure 5:
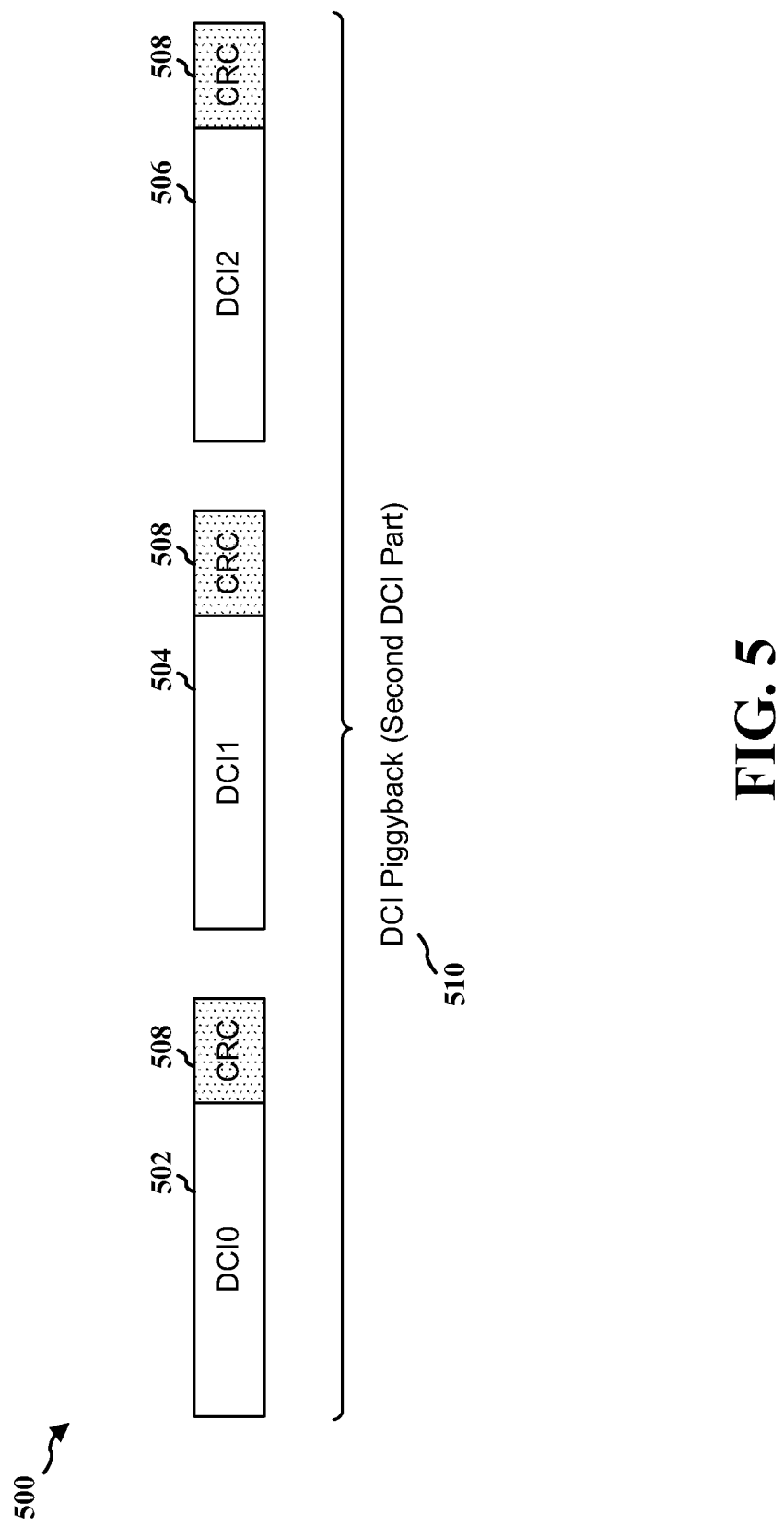
FIG. 5 is a diagram illustrating an example of multiple component DCIs.

FIG. 5 is a diagram 500 illustrating multiple component DCIs in a DCI piggyback, where three component DCIs 502, 504 and 506 are transmitted within the DCI piggyback 510. As each component DCI may include a CRC 508, the CRC 508 may use added space in the transmission for each CRC, which may be, e.g., 24 bits long. This added bits for the different CRC may reduce the efficiency of the transmission when multiple component DCIs are transmitted.

Figure 6:
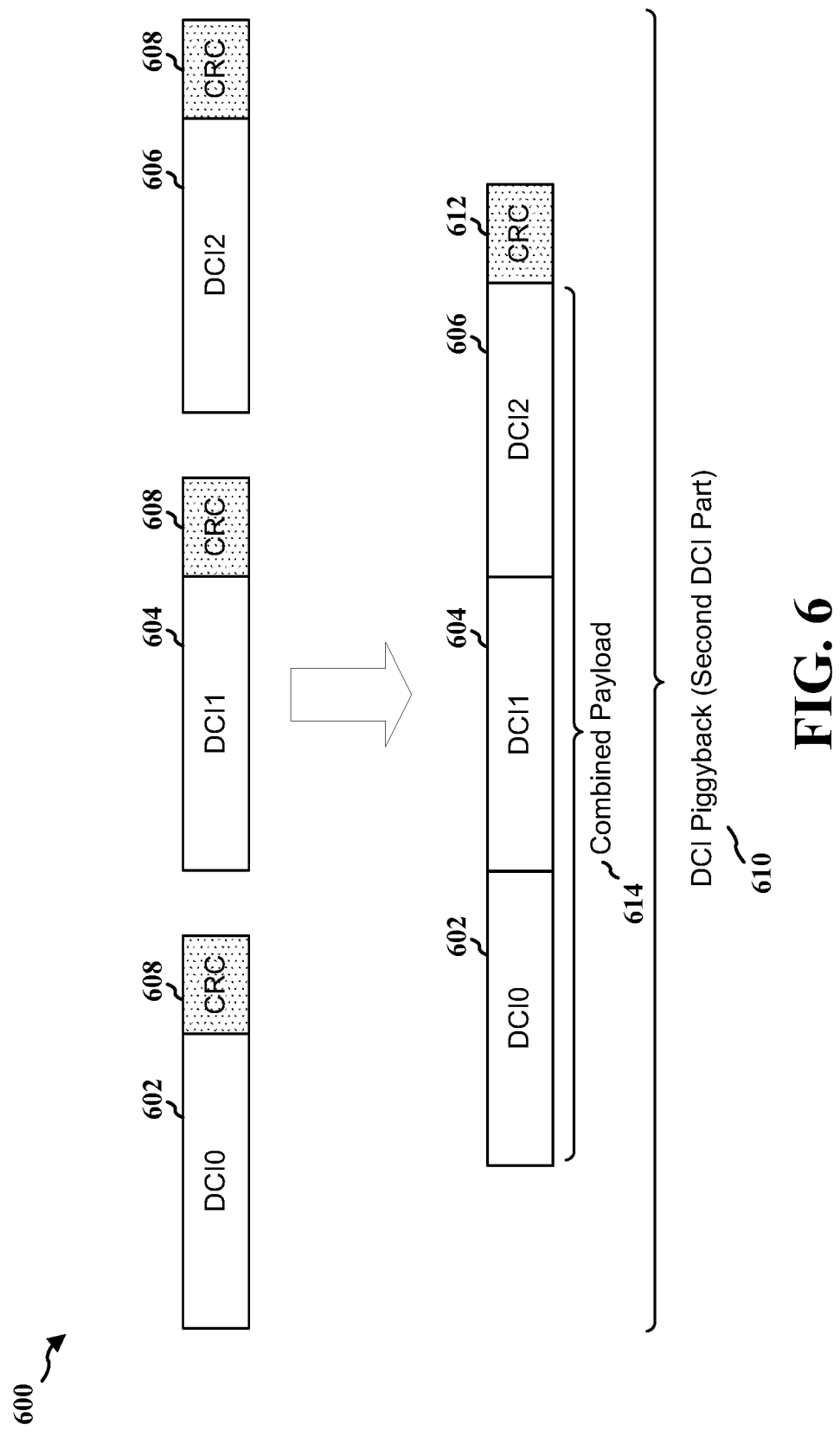
FIG. 6 is a diagram illustrating an example of multiple component DCIs.

To reduce the space taken by CRC accompanying each component DCI, when multiple component DCIs are transmitted in the PDSCH, the base station may combine the multiple component DCIs into a single payload that is jointly encoded with one CRC instead. FIG. 6 is a diagram 600 illustrating an example of combining multiple component DCIs and encoding them with one CRC. For example, three component DCIs 602, 604, 606 may be included in a DCI piggyback 610, where each component DCI may have one corresponding CRC 608. When DCIs are transmitted in a PDDCH, each DCI may be associated with one CRC for decoding. However, when DCIs (e.g., component DCIs) are transmitted in the PDSCH, the component DCIs may be combined and encoded with one CRC. Thus, component DCIs 602, 604 and 606 may be combined into a payload 614 in PDSCH, and then jointly encoded with one CRC 612. A long polar code may be used for the CRC 612 and the combined payload 614 (e.g., the multiple component DCIs). By combing multiple component DCIs and encoding them with one CRC (e.g., 612), one decoding may be performed instead of multiple decodings, e.g., three decodings may be required before combining as there were three separate CRCs 608 for components DCI 602, 604, 606. This may reduce the total size of the payload, where each CRC reduced may save extra 24 bits for the payload. As mentioned previously, the CRC 612 may be scrambled by one RNTI, and the same RNTI may be used to scramble the combined payload 614. The RNTI may be a cell-RNTI (C-RNTI), or it may be a configurable new RNTI.

Aspects present herein illustrate ways to combine or aggregate component DCIs in a DCI piggyback. A UE may be configured to monitor for different lengths (e.g., sizes) of component DCIs because different component DCIs may have different lengths. The length of each component DCI may depend on a configured DCI format. The UE may be configured to monitor multiple (e.g., up to four) different lengths of DCIs per component carrier (CC). However, the UE may not know ahead of time the DCI format (e.g., length) for each component DCI in the DCI piggyback. For a UE to decode a combined payload (e.g., 614) with one CRC (e.g., 612), the first DCI part (e.g., DCI in PDDCH)

may need to indicate to the UE about the length of each component DCI. This may increase the overhead of the first DCI part.

Figure 7:
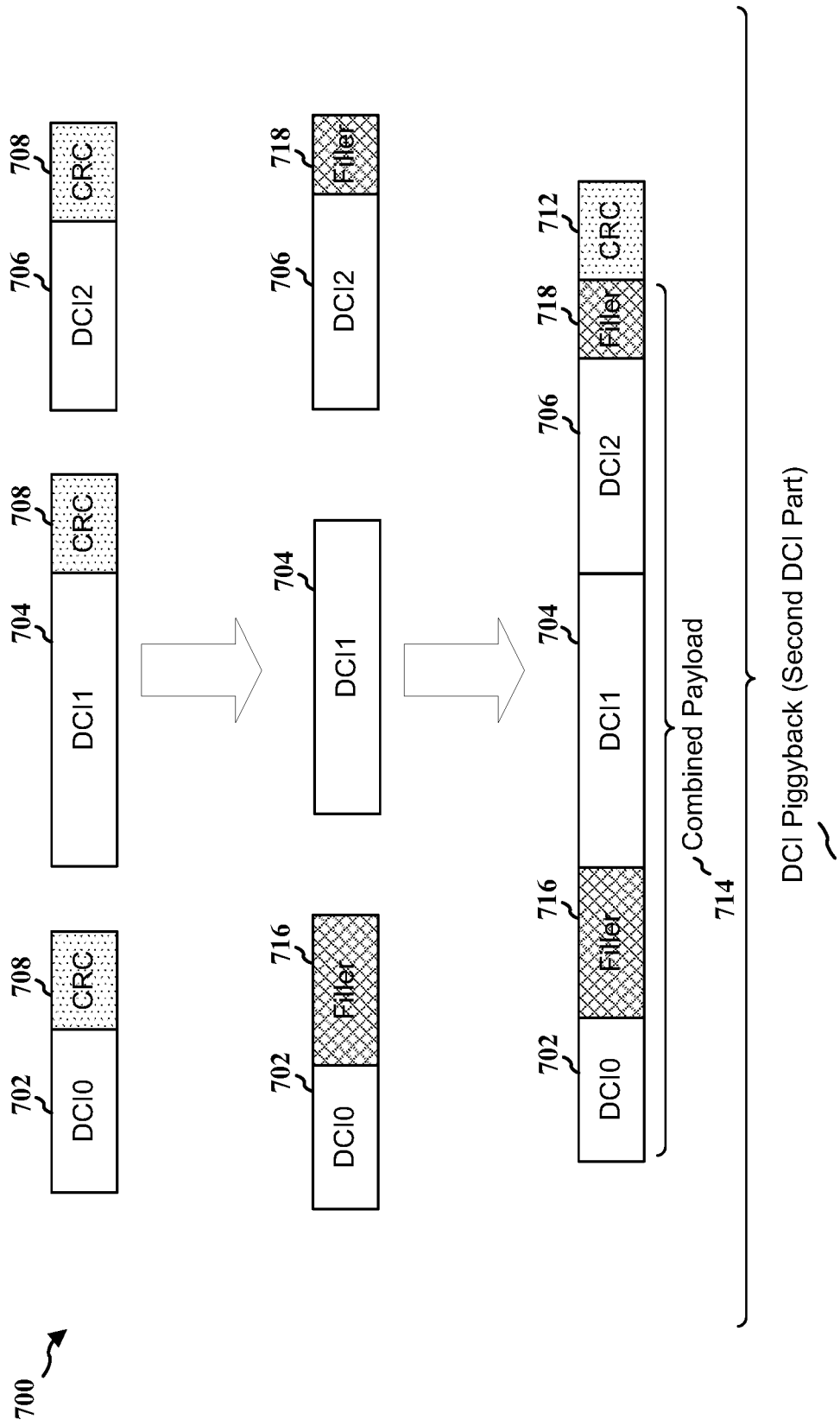
FIG. 7 is a diagram illustrating an example of multiple component DCIs.

In one example, zero paddings (e.g., signal or spectrum extension with zeros) may be added to component DCI(s) in a DCI piggyback to make component DCIs having same length as each other. For example, component DCI(s) within the DCI piggyback may be added with zero paddings until its length matches the longest component DCI length of which the UE is monitoring, minus CRC. FIG. 7 is a diagram 700 illustrating using zero paddings to match up lengths of component DCIs. For example, three component DCIs 702, 704, 706 may be included in a DCI piggyback 710, where each component DCI may have one corresponding CRC 708. Component DCI 702 may be 50 bits long, component DCI 704 may be 100 bits long, and the component DCI 706 may be 80 bits long. If the longest DCI length a UE is configured to monitor is 100 bits, which is also the length for DCI component 704 (e.g., configured via a DCI format), the entity transmitting the DCI piggyback (e.g., a base station) may add zero paddings to component DCIs that are short of the longest monitored length (e.g., 100 bits) to make them to have the same length. For example, 50 bits of zero padding 716 may be added to component DCI 702 to make it 100 bits long, and 20 bits of zero padding 718 may be added to component DCI 706 to make it 100 bits long. Thus, component DCIs 702, 704 and 706 may be combined into a payload 714 in the same size (e.g., 100 bits each), and then jointly encoded with one CRC 712.

In another example, if the longest DCI length the UE is monitoring in FIG. 7 is 120 bits long, zero paddings may be added to all three component DCIs to make each of them into 120 bits long, e.g., 70 bits of zero padding for component DCI 702, 20 bits of zero padding for component DCI 704 and 40 bits of zero padding for component DCI 706. Component DCIs 702, 704 and 706 may then be combined into a payload 714 in the same size (e.g., 120 bits each), and then jointly encoded with one CRC 712.

By utilizing zero paddings, as each component DCI is equal in length, the first DCI part (e.g., DCI in PDDCH) may indicate to the UE (e.g., in an assistant information part) how many component DCIs are included in the DCI piggyback rather than indicating the length of each component DCI within the DCI piggyback. This may reduce the overhead size of the first DCI part, and the number of component DCIs within the DCI piggyback may be quantized.

Information related to joint-encoding of multiple component DCIs (e.g., size of encodings and number of component DCIs, etc.) may be included in the first DCI part with other DCI piggyback related information (e.g., piggyback control information). For example, a beta offset for coding rate control may be used to indicate the length of a DCI and the coding rate. Thus, for a larger DCI piggyback length (e.g., the combined component DCIs), the base station may use the beta offset to indicate to the UE to use higher coding rate to reduce resources used. Alternatively, information related to DCI piggyback and the component DCIs may also be RRC configured, such as within the content of the piggyback control field.

As different DCI formats may provide different DCI length, a UE receiving the DCI may perform blind decoding first by monitoring DCIs with different lengths. If the length of a received DCI matches one of the monitored lengths, for the same length DCI, the UE may then try different RNTI to determine whether the DCI (e.g., PDCCH) carries its control information. Different DCI formats may be distinguished based on a DCI's length and its CRC scrambling. For example, between DCI formats 1_1 and 0_1, a UL/DL flag may be flagged when their length matches. Similarly, between DCI formats 1_0 and 0_0, a UL/DL flag may be flagged when their length matches. However, for DCI formats between 1_1/0_1 and 1_0/0_0, the DCI length may always be different between them, where an 1 bit filler may also be used to make them different if needed. Also, for DCIs with same DCI format, different RNTI scrambling may lead to different interpretation, such as between C-RNTI and Configured Scheduling-RNTI (CS-RNTI). Thus, if zero paddings are applied to multiple component DCIs to match their lengths and these multiple components DCIs are aggregated (e.g., combined), a UE receiving the aggregated component DCIs may not be able to differentiate the DCI format for each component DCI in certain cases.

To avoid this, in one example, a configurable header may be included in each component DCI (e.g., 702, 704, 706) to indicate its RNTI and DCI format combination. For example, a two bits header may be used where 0 (e.g., bits 00) may indicate C-RNTI for non-fallback, 1 (e.g., bits 01) may indicate C-RNTI for fallback, and/or 2 (e.g., bits 10) may indicate CS-RNTI with non-fallback, etc. This may optionally be RRC configured for the UE, or the rule may be hard coded (e.g., embedding into the source code). Thus, after the UE decodes the combined payload (e.g., 714) using CRC (e.g., 712), based on the configurable header in each component DCI (e.g., 702, 704, 706), the UE may determine the RNTI and DCI format combination for each component DCI. In some examples, a fallback DCI or a fallback component DCI may be referring to DCI used in LTE while a non-fallback DCI or a non-fallback component DCI may be referring to DCI used in NR.

In another example, for a UE to differentiate the DCI format of each component DCI, types of component DCI that may be included in a DCI piggyback may be limited or defined. For example, fallback component DCIs may be excluded from the DCI piggyback. For example, it may be less important to optimize the efficiency of fallback DCI delivery. Thus, a UE receiving the DCI piggyback may determine that the component DCIs within the DCI piggyback are not fallback component DCIs. In other example, only C-RNTI based DCI may be included in the DCI piggyback so that the UE receiving the DCI piggyback may determine that the component DCIs are C-RNTI based. As configurations or parameters like configured grant (CG) and SPS activation may be time critical, they may not need to be included in the DCI piggyback.

Figure 8:
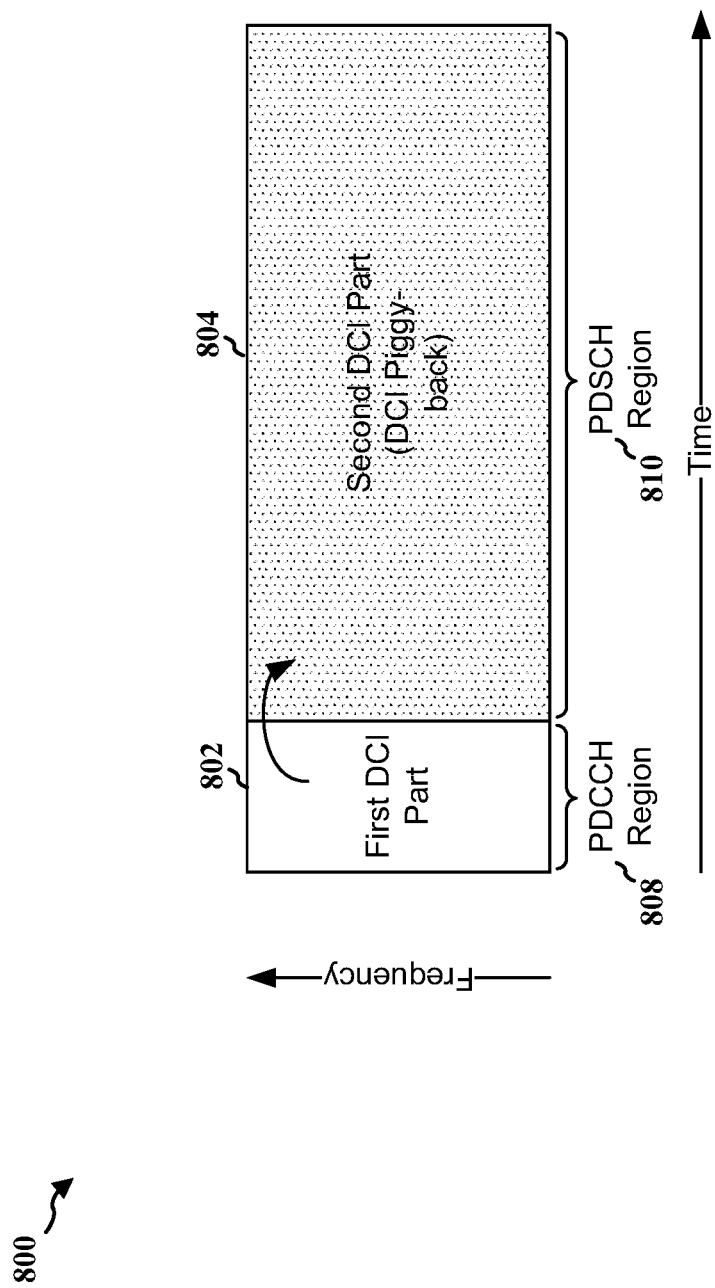
FIG. 8 is a diagram illustrating an example of transmitting DCI in multiple parts.

In some cases, multiple component DCIs may be transmitted for the same UE and there may not be enough space for transmitting the PDSCH data. In other cases, the PDSCH payload size may not be considering the DCI piggyback in certain network as it may have a heavy impact on the PDSCH decoding. Aspects presented herein may be used to avoid or alleviate such circumstances. In one example, a special transmission mode may be configured for a base station or a transmitting entity where the PDSCH may be configured to carry DCI piggyback without carrying any data transporting blocks (TBs). FIG. 8 is an example diagram 800 showing a PDSCH region 810 carrying DCI piggyback 808 without any TBs. Referring back to FIG. 4, the DCI piggyback 404 occupies a portion of the PDSCH region 410, and data TBs may be transmitted in downlink traffic 406 part of the PDSCH region 410. In FIG. 8, the DCI piggyback 808 may occupy the entire PDSCH region 810 and the PDSCH may not carry any TBs. This configuration may be indicated by a special field or field combinations in the first DCI part 802. For example, a special value may be configured in the DCI piggyback control information field of the first DCI part 802. Other values of the DCI piggyback control information field may also be used to indicate the combinations of the beta factor and the number of component DCIs. Such configuration may reduce the potential conflict between DCI piggyback and PDSCH data TBs when DCI piggyback may take up too much space or when DCI piggyback may have impact on the PDSCH decoding.

While multiple component DCIs may be aggregated together to form one codeword (e.g., the combined payload 614, 714 with their respective CRC 612, 712), different component DCIs within a DCI piggyback may have different purposes, requirements and/or intended uses. For example, different groups of component DCIs may have different level of reliability requirement, where some component DCIs may be intended for URLLC while others may be intended for eMBB, etc. In addition, different groups of component DCIs may also have different matched size (e.g., some may be 100 bits long and others may be 120 bits long, as described in connection with FIG. 7). The size between fallback DCIs and non-fallback DCIs may also be different. Thus, in certain circumstances, it may be beneficial to group component DCIs having similar purposes, requirements and/or intended uses to into the same codeword (e.g., combined payload). Further, a polar code (e.g., as described in connection with FIG. 6) may have a limitation in its length and the amount of DCI payload it may carry, in some cases, the control information within the DCI piggyback may take up too many bits such that there may not be enough room to include all information in one control codeword. For example, when there are too many component DCIs, a long polar code may split into multiple groups.

In one example, multiple codewords (e.g., combined component DCIs) may be configured for multiple DCI piggybacks in the PDSCH (e.g., up to 2). Each DCI piggyback may be polar encoded and the codewords may be rate matched sequentially. FIG. 9A is a diagram 900A illustrating using separate control fields for multiple codewords, where each codeword may be a groups of component DCIs in a DCI piggyback. For example, a separate control fields 912, 914 may be included in the first DCI part 902, where a first control field 912 may be used for indicating control information for the codeword within the first DCI piggyback 904 and a second control field 914 may be used for indicating control information for the codeword within the second DCI piggyback 916. The configuration for the control fields 912, 914 may be different, such as using a set of beta factors. The control field for each codeword may also indicate an empty codeword (e.g., when there is no corresponding DCI piggyback). Alternatively, as shown by diagram 900B in FIG. 9B, a single control field 912 may be included in the first DCI part 902, and the first control field 912 may be used for indicating control information for the codeword within the first DCI piggyback 904. The first DCI piggyback 904 may include another piggyback control field 914, which may be used for indicating control information for a second DCI piggyback 916. Similarly, the piggyback control field 914 in the first DCI piggyback 902 may indicate no additional DCI piggyback (e.g., when there is no second DCI piggyback 916).

Figure 10:
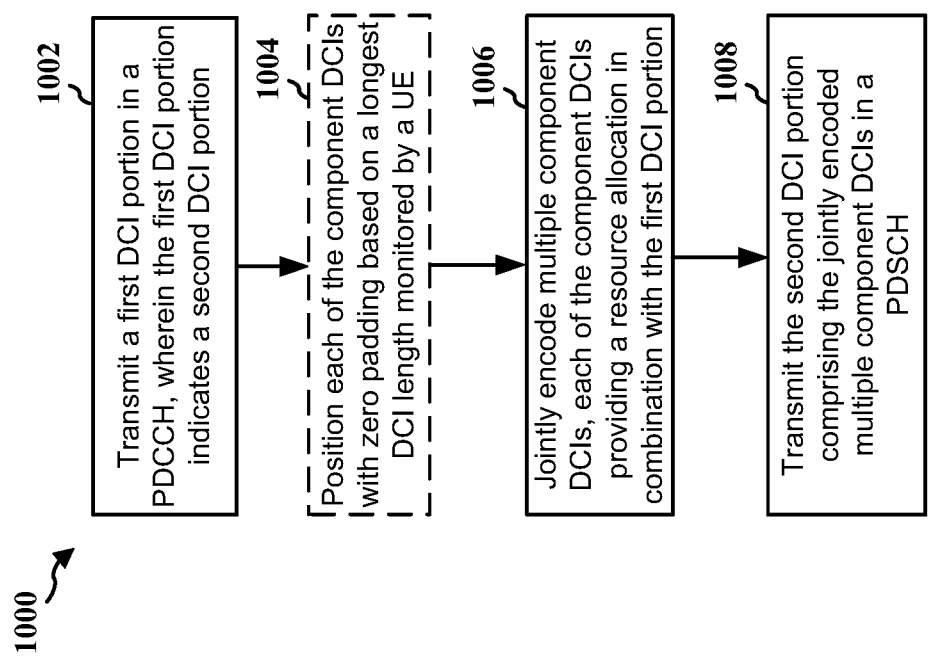
FIG. 10 is a flowchart of a method of wireless communication.

FIG. 10 is a flowchart of a method 1000 of wireless communication. The method may be performed by a base station or a component of a base station (e.g., the base station 102, 180, 310; the processing system, which may include the memory 376 and which may be the entire base station 310 or a component of the base station 310, such as the TX processor 316, the RX processor 370, and/or the controller/processor 375). Optional aspects are illustrated with a dashed line. The method may enable a base station to transmit DCI in multiple portions. For example, a first DCI portion may be transmitted within the PDCCH region and a second DCI portion may be transmitted within the PDSCH. The first DCI portion may include initial control information for a downlink assignment, and it may also include control information about the second DCI portion. The second DCI portion may include multiple component DCIs, and each component DCI may comprise remaining control information regarding the downlink assignment.

At 1002, the base station may transmit the first DCI portion (e.g., 402, 802, 902) in a PDCCH (e.g., 408, 808, 908), where the first DCI portion indicates a second DCI portion, such as described in connection with FIGS. 4, 8 and 9. For example, a first DCI portion may be transmitted within the PDCCH region. The first DCI portion may include initial control information for a downlink assignment, and it may also include control information about a second DCI portion. The transmission of the first DCI portion may be performed, e.g., by the first DCI portion component 1108 and/or the transmission component 1106 of the apparatus 1102 in FIG. 11. The base station may indicate, in the first DCI portion in the PDCCH, a number of component DCIs (e.g., 502, 504, 506, 602, 604, 606, 702, 704, 706) that may be sent in the second DCI portion (e.g., 404, 510, 610, 710, 804, 904). The second DCI portion may include a header indicating a DCI format and RNTI combination for each of the multiple component DCIs, such as described in connection with FIG. 7.

At 1004, the base station may position each of the component DCIs with zero padding (e.g., 716, 718) based on a longest DCI length monitored by a UE, such as described in connection with FIG. 7. The positioning may be performed, e.g., by the position component 1112 of the apparatus 1102 in FIG. 11. The padding may be applied to one or more of the multiple component DCIs based on a DCI length, e.g., a longest DCI length monitored by the UE. For example, if the longest DCI length a UE is configured to monitor is 100 bits, the base station may add zero paddings to component DCIs that are short of the 100 bits and make them into 100 bits. Then, the base station may transmit an indication of the DCI length (e.g., longest) to the UE, where the DCI length may be jointly encoded with a beta offset for a coding rate control, such as described in connection with FIG. 7. Alternatively or additionally, the base station may configure the DCI length for the UE in RRC signaling.

At 1006, the base station may jointly encode multiple component DCIs, each of the component DCIs may providing a resource allocation in combination with the first DCI portion, such as described in connection with FIGS. 5 to 7. In some examples, the second DCI portion may not include one or more types of DCI(s), which may be defined or configured by a network. For example, a base station may be configured not to include DCIs such as a fallback DCI and/or a non-C-RNTI based DCI in the second DCI portion, such as by setting up a filtering mechanism and/or a rule (e.g., through programming). The filtering may also be performed by an exclusion component of the base station, such as the exclusion component 1116 of the apparatus 1102 in FIG. 11.

Figure 11:
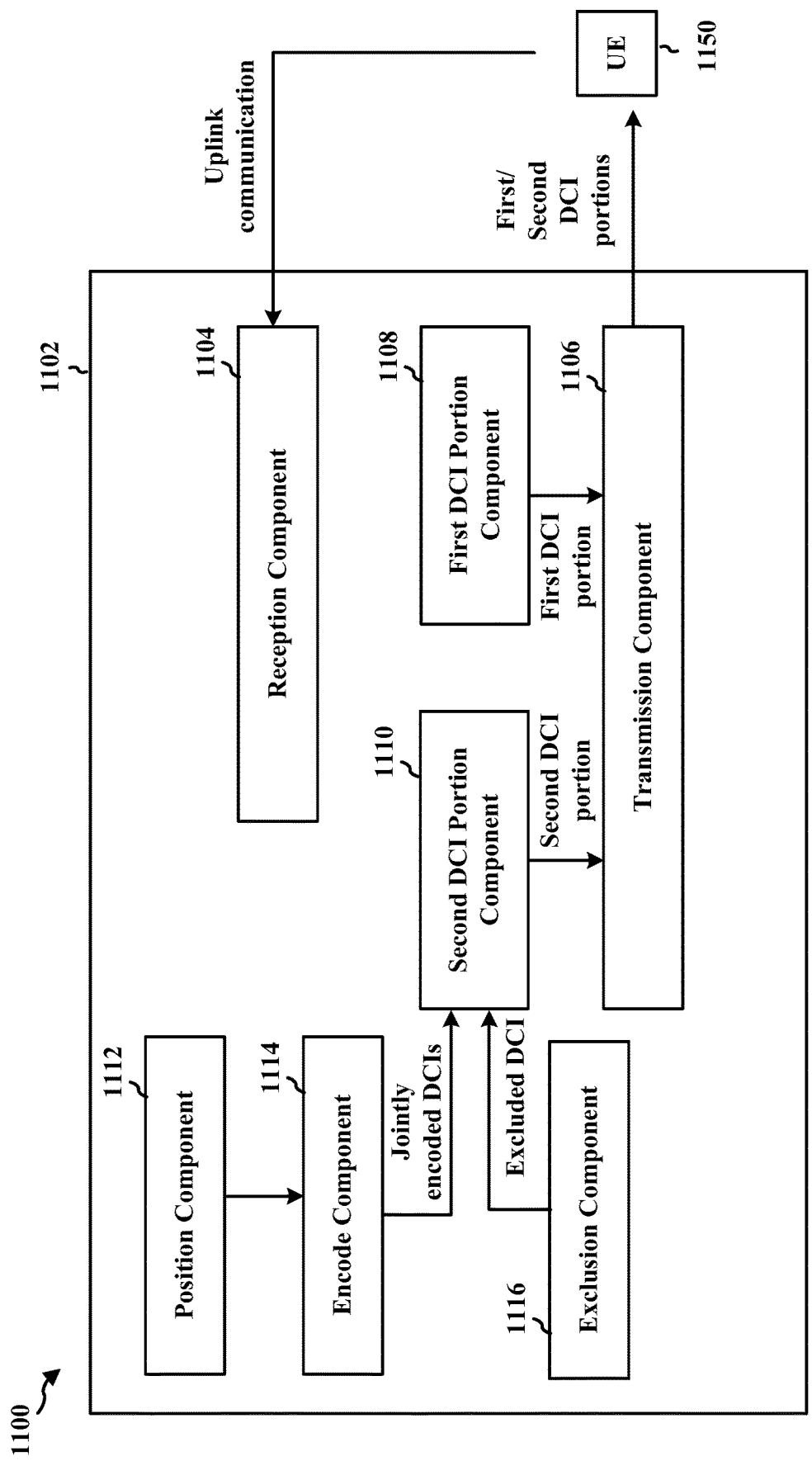
FIG. 11 is a conceptual data flow diagram illustrating the data flow between different means/components in an example apparatus.

The join encoding may be performed, e.g., by the encode component 1114 of the apparatus 1102 in FIG. 11. The base station may jointly encode the multiple component DCIs with a single CRC (e.g., 612, 712), such as described in connection with FIGS. 6 and 7, where the CRC may be scrambled with a joint RNTI. In addition, the base station may jointly encode the multiple component DCIs using a single polar code, such as describe in connection with FIG. 6. Each of the multiple component DCIs in the second DCI portion may allocate resources for at least one of: a PDSCH transmission, a PUSCH, a PUCCH, CSI-RS, or SRS.

In some example, the base station may first jointly encode multiple component DCIs to form a first codeword (e.g., grouped component DCIs in 904 of FIGS. 9A and 9B), and the base station may jointly encode an additional set of multiple component DCIs to form a second codeword (e.g., grouped component DCIs in 916 of FIGS. 9A and 9B), such as described in connection with FIGS. 9A and 9B. The second codeword may be transmitted with the first codeword in the second DCI portion in the PDSCH (e.g., 910), such as described in connection with FIGS. 9A and 9B. The first codeword and the second codeword may be polar encoded and mapped sequentially. The first DCI portion (e.g., 902) may comprise a field with configuration information (e.g., 912, 914) for the first codeword and the second codeword, such as described in connection with FIG. 9A. Alternatively, the first DCI portion (e.g., 902) may comprise first configuration information (e.g., 912) for the first codeword and the second DCI portion comprises second configuration information (e.g., 914) for the second codeword, such as described in connection with FIG. 9B. In a configuration with multiple codewords, the first DCI portion may comprise configuration information for a codeword formed based on the jointly encoded multiple component DCIs and the second DCI portion comprises an indication that no additional component DCIs are included in the PDSCH, such as described in connection with FIGS. 9A and 9B.

At 1008, the base station may transmit the second DCI portion comprising the jointly encoded multiple component DCIs in a PDSCH (e.g., 410, 810, 910). The second DCI portion may be transmitted within the PDSCH. The second DCI portion may include multiple component DCIs, and each component DCI may comprise remaining control information regarding the downlink assignment. The transmission of the second DCI portion may be performed, e.g., by the second DCI portion component 1110 and/or the transmission component 1106 of the apparatus 1102 in FIG. 11. In some example, the base station may transmit the second DCI portion in the PDSCH without data, such as described in connection with FIG. 8. For example, the PDSCH may only contain the second DCI portion without any user data. In this case, the first DCI portion may indicate to the UE that the second DCI portion will be transmitted in the PDSCH without data.

FIG. 11 is a conceptual data flow diagram 1100 illustrating the data flow between different means/components in an example apparatus 1102. The apparatus may be a base station or a component of a base station. The apparatus 1102 includes a reception component 1104 that receives uplink communication from a UE 1150 and a transmission component 1106 that transmits downlink communication to the UE 1150. The apparatus 1102 includes a first DCI portion component 1108 configured to transmit a first DCI portion in a PDCCH, e.g., as described in connection with 1002 in FIG. 10. The apparatus 1102 includes an encode component 1114 configured to jointly encode multiple component DCIs, each of the component DCIs providing a resource allocation in combination with the first DCI portion, e.g., as described in connection with 1006 in FIG. 10. The apparatus 1102 includes a second DCI portion component 1110 configured to transmit the second DCI portion comprising the jointly encoded multiple component DCIs in a PDSCH, e.g., as described in connection with 1008 in FIG. 10. The apparatus 1102 includes a position component 1112 configured to position each of the components of DCI, e.g., as described in connection with 1004 in FIG. 10. The apparatus 1102 includes an exclusion component 1116 configured to exclude one or more types of DCI from the second DCI portion, e.g., as described in connection with 1006 in FIG. 10.

The apparatus 1102 may include additional components that perform each of the blocks of the algorithm in the aforementioned flowcharts of FIG. 10. As such, each block in the aforementioned flowchart of FIG. 10 and aspects performed by the base station 102, 180, 310 may be performed by at least one component of an apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The system may be a component of the base station 310 and may include the memory 376 and/or at least one of the TX processor 316, the RX processor 370, and the controller/processor 375. Alternatively, the processing system may be the entire base station (e.g., see 310 of FIG. 3).

Figure 12:
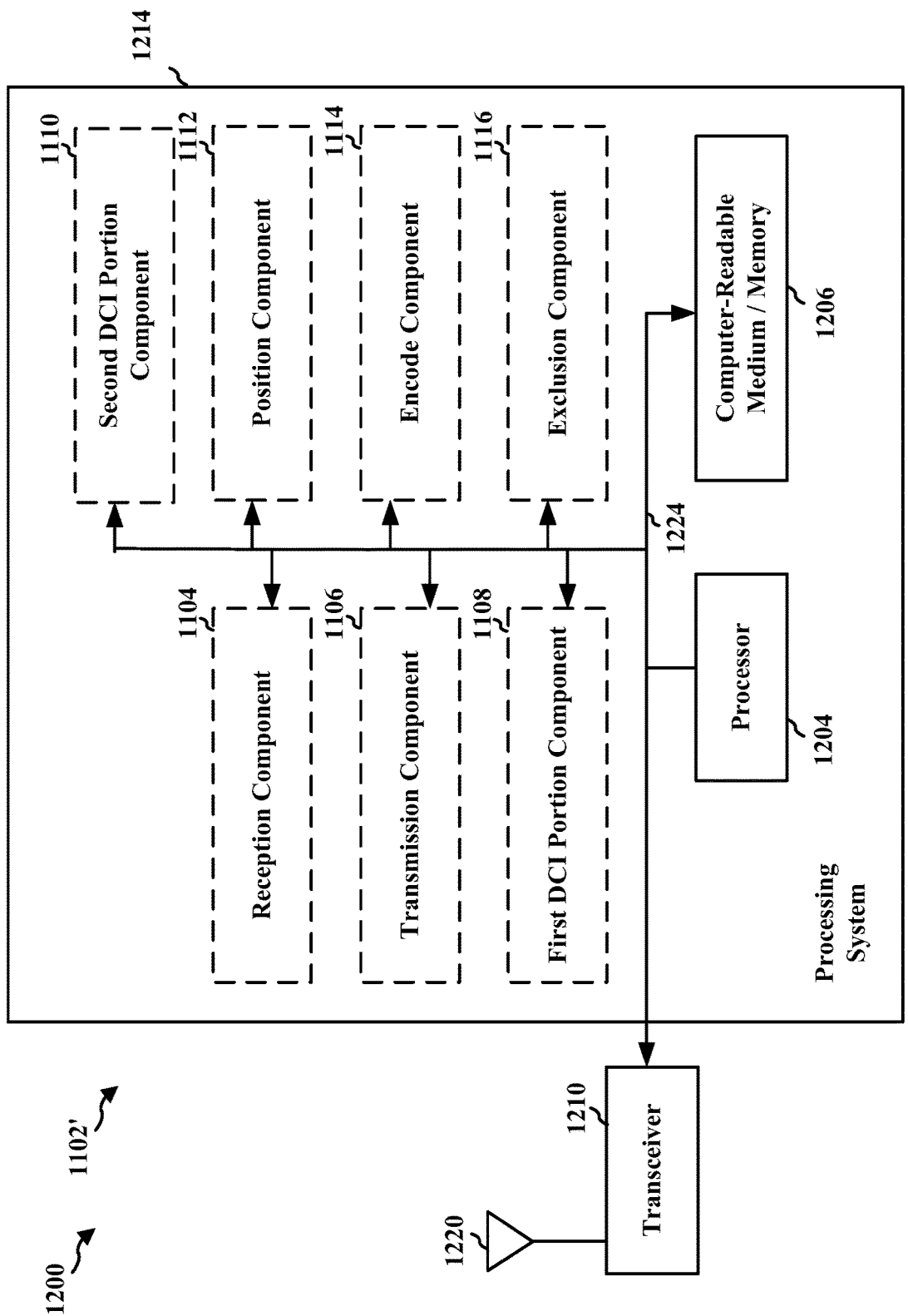
FIG. 12 is a diagram illustrating an example of a hardware implementation for an apparatus employing a processing system

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112,

1114, 1116. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, an apparatus for wireless communication at a base station may include means for transmitting a first DCI portion in a PDCCH; means for jointly encoding multiple component DCIs, each of the component DCIs providing a resource allocation in combination with the first DCI portion; and means for transmitting a second DCI portion comprising the jointly encoded multiple component DCIs in a PDSCH, e.g., as described in connection with FIGS. 4 to 9. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
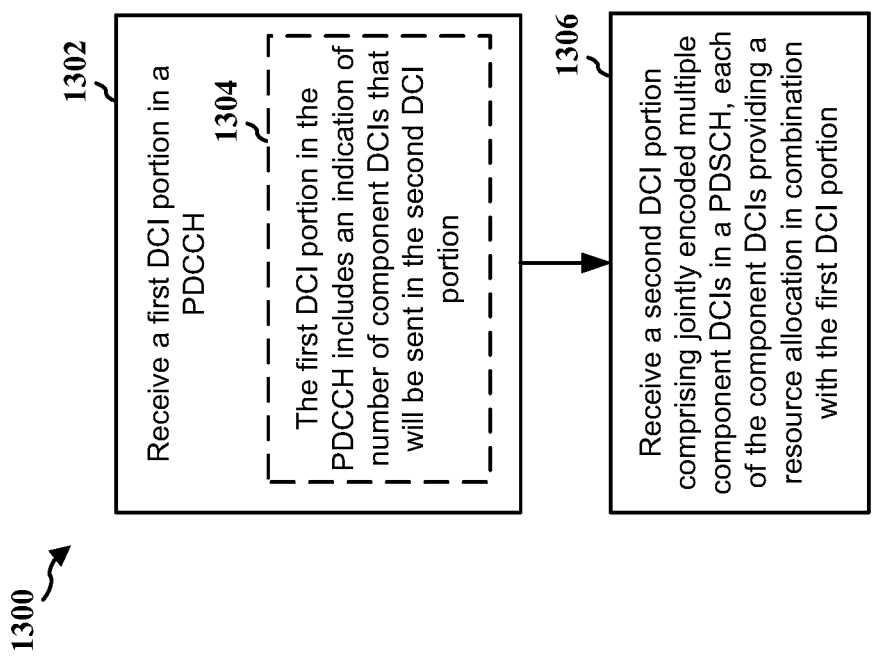
FIG. 13 is a flowchart of a method of wireless communication.

FIG. 13 is a flowchart of a method 1300 of wireless communication. The method may be performed by a UE or a component of a UE (e.g., the UE 104, 350; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to receive and decode DCI in multiple portions. For example, the UE may receive a first DCI portion in the PDCCH and a second DCI portion or more in the PDSCH. The first DCI portion may include initial control information for a downlink assignment, and it may also include control information about the second DCI portion. The second DCI portion may include multiple component DCIs, and each component DCI may comprise remaining control information regarding the downlink assignment.

At 1302, the UE may receive a first DCI portion (e.g., 402, 802, 902) in a PDCCH (e.g., 408, 808, 908), such as described in connection with FIGS. 4, 8 and 9. For example, the UE may receive a first DCI portion in the PDCCH and a second DCI portion or more in the PDSCH. The first DCI portion may include initial control information for a downlink assignment, and it may also include control information about the second DCI portion. The reception of the first DCI portion may be performed, e.g., by the reception component 1404 and/or first DCI portion reception component 1408 of the apparatus 1402 in FIG. 14. The decoding of the first DCI portion may be performed, e.g., by the decode component 1412 of the apparatus 1402 in FIG. 14.

In addition, as shown at 1304, the first DCI portion may include an indication of number of component DCIs that may be sent by the base station in the second DCI portion, such as described in connection with FIG. 7. The reception of the indication may be performed, e.g., by the reception component 1404 and/or first DCI portion reception component 1408 of the apparatus 1402 in FIG. 14. In some example, each of the component DCIs may be positioned with zero padding(s) (e.g., 716, 718) based on a longest DCI length monitored by the UE. For example, one or more of the multiple component DCIs are padded based on a DCI length (e.g., longest DCI length monitored by the UE), such as described in connection with FIG. 7. The UE may receive an indication of the DCI length from the base station, where the indication of the DCI length may be jointly encoded with a beta offset for a coding rate control, such as described in connection with FIG. 7. Alternative or additionally, the UE may receive a configuration of the DCI length in RRC signaling. The reception of the first RRC configuration may be performed, e.g., by the reception component 1404 of the apparatus 1402 in FIG. 14, and the RRC configuration may be performed by the RRC configuration component 1414 of the apparatus 1402 in FIG. 14.

At 1306, the UE may receive a second DCI portion (e.g., 404, 510, 610, 710, 804, 904) comprising jointly encoded multiple component DCIs (e.g., 502, 504, 506, 602, 604, 606, 702, 704, 706) in a PDSCH (e.g., 410, 810, 910), each of the component DCIs may provide a resource allocation in combination with the first DCI portion, such as described in connection with FIGS. 5 to 7. The reception of the second DCI portion may be performed, e.g., by the reception component 1404 and/or the second DCI portion reception component 1410 of the apparatus 1402 in FIG. 14. The decoding of the second DCI portion may be performed, e.g., by the decode component 1412 of the apparatus 1402 in FIG. 14. The second DCI portion may include multiple component DCIs, and each component DCI may comprise remaining control information regarding the downlink assignment. The multiple component DCIs received may have been jointly encoded with a single CRC, and the CRC may be scrambled with a RNTI. In addition, the multiple component DCIs are jointly encoded with a single polar code, such as described in connection with FIG. 6. In some examples, the UE may receive the second DCI portion in the PDSCH, where the PDSCH may not contain any user data. In other examples, the second DCI portion may include a header indicating a DCI format and RNTI combination for each of the multiple component DCIs, such as described in connection with FIG. 7. Based on the assignment information decoded from the first DCI portion and/or the second DCI portion, the UE may transmit data to the base station based on the assignment information. The transmission may be performed, e.g., by the transmission component 1406 of the apparatus 1402 in FIG. 14.

In some examples, multiple component DCIs are jointly encoded to form a first codeword (e.g., grouped component DCIs in 904 of FIG. 9), and an additional set of multiple component DCIs may be jointly encoded to form a second codeword (e.g., grouped component DCIs in 916), such as described in connection with FIGS. 9A and 9B. The UE may receive the second codeword with the first codeword in the second DCI portion in the PDSCH. The first codeword and the second codeword may be polar encoded and mapped sequentially. When multiple codewords are included, the first DCI portion (e.g., 902) comprises a field with configuration information (e.g., 912, 914) for the first codeword and the second codeword, such as described in connection with FIG. 9A. Alternatively, the first DCI portion (e.g., 902) may comprise first configuration information (e.g., 912) for the first codeword and the second DCI portion may comprise second configuration information (e.g., 914) for the second codeword. The first DCI portion may comprise configuration information for a codeword formed based on the jointly encoded multiple component DCIs and the second DCI portion may comprise an indication that no additional component DCIs are included in the PDSCH, such as described in connection with FIGS. 9A and 9B.

Figure 14:
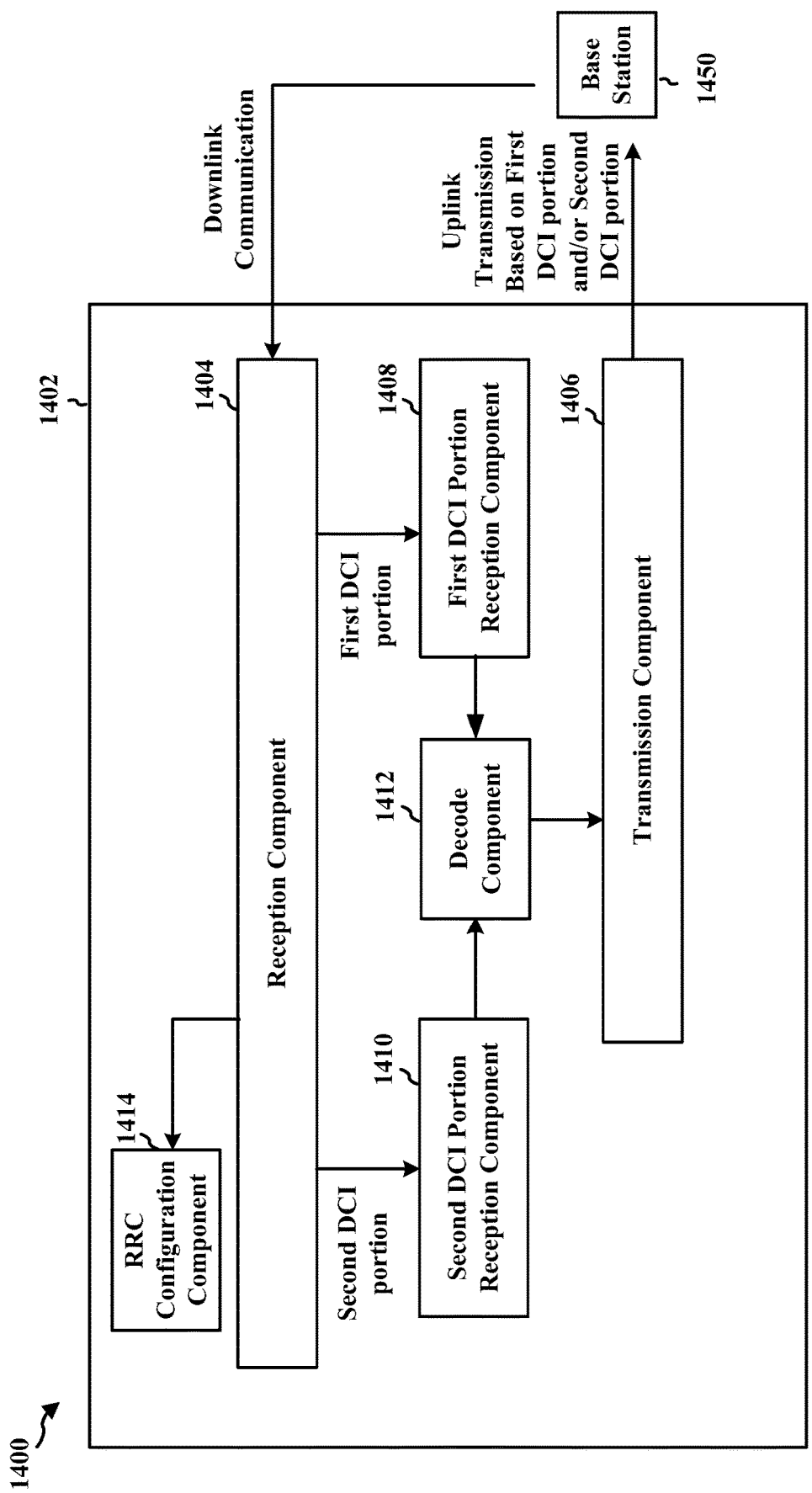
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a UE or a component of a UE. The apparatus 1102 includes a reception component 1404 that receives downlink communication from a base station 1450 and a transmission component 1406 that uplink downlink communication to the base station 1450. The apparatus 1402 includes a first DCI portion reception component 1408 configured to receive a first DCI portion in a PDCCH, e.g., as described in connection with 1302 in FIG. 13. The apparatus 1402 includes a decode component 1412 configured to decode DCIs (e.g., first DCI portion and/or second DCI portion). The decoded first DCI portion may include an indication of number of component DCIs that will be sent in the second DCI portion, e.g., as described in connection with 1304 in FIG. 13. The apparatus 1402 includes a second DCI portion reception component 1410 configured to receive the second DCI portion comprising the jointly encoded multiple component DCIs in a PDSCH, e.g., as described in connection with 1306 in FIG. 13. The apparatus 1402 includes a RRC configuration component 1414 configured to receive RRC signaling and configure the UE based on the RRC signaling, e.g., to determine the length of each component DCI.

The apparatus 1402 may include additional components that perform each of the blocks of the algorithm in the aforementioned flowcharts of FIG. 13. As such, each block in the aforementioned flowcharts of FIG. 13 and aspects performed by the UE 104, 350 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. The system may be a component of the UE 350 may include the memory 360, the TX Processor 368, the RX Processor 356, and the controller/processor 359. Alternatively, the processing system may be the entire UE (e.g., see 350 of FIG. 3).

Figure 15:
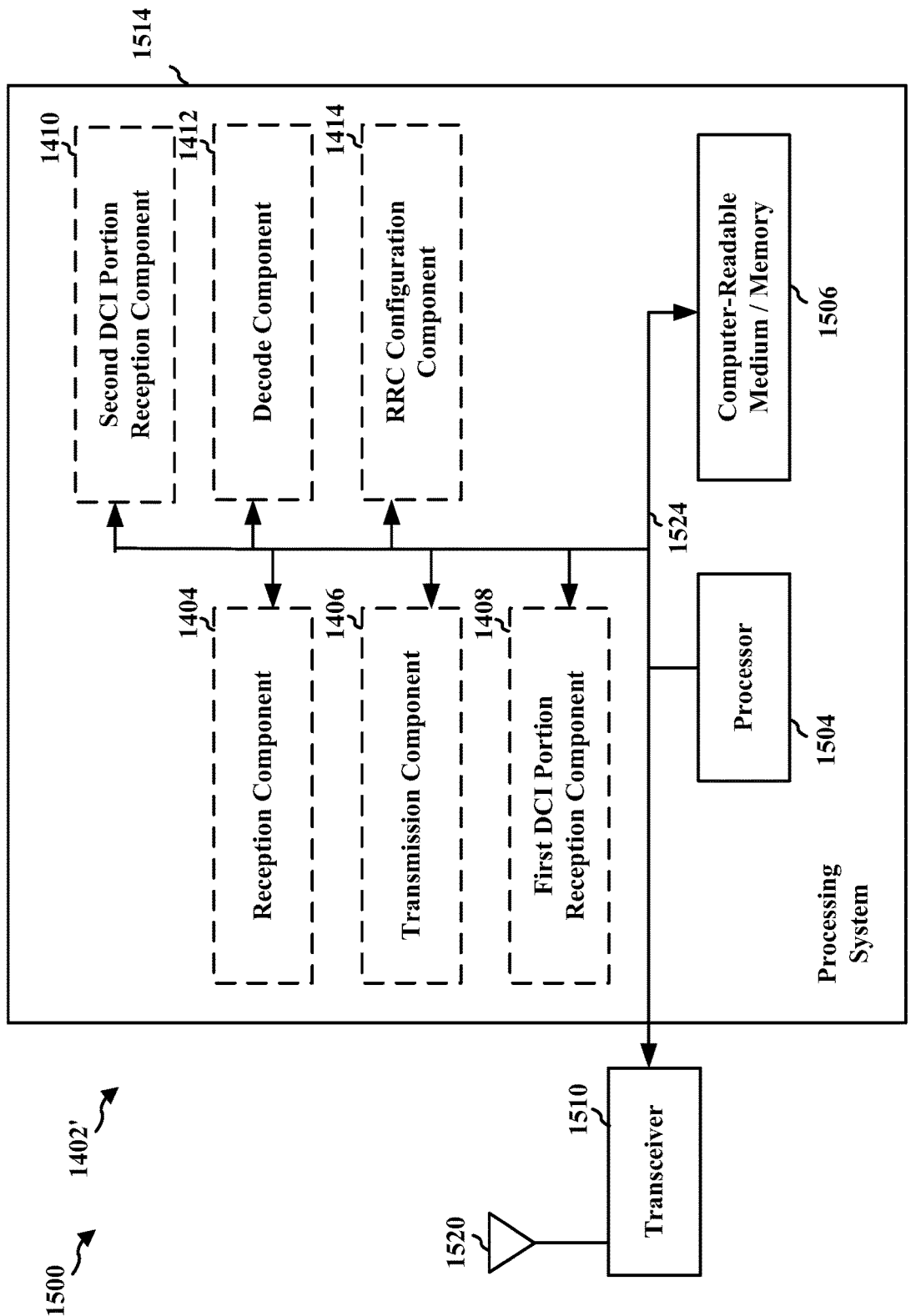
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412 and 1414. The components may be software components running in the processor 1504, resident/stored in the computer readable medium/memory 1506, one or more hardware components coupled to the processor 1504, or some combination thereof. The processing system 1514 may be a component of the UE 350 and may include the memory 360, the TX Processor 368, the RX Processor 356, and the controller/processor 359. Alternatively, the processing system may be the entire UE (e.g., see 350 of FIG. 3).

In one configuration, an apparatus for wireless communication at UE may include means for receiving a first DCI portion in a PDCCH; and means for receiving a second DCI portion comprising jointly encoded multiple component DCIs in a PDSCH, each of the component DCIs providing a resource allocation in combination with the first DCI portion, e.g., as described in connection with FIGS. 4 to 9. The aforementioned means may be one or more of the aforementioned components of the apparatus and/or the processing system of the apparatus may be configured to perform the functions recited by the aforementioned means. The processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of other embodiments or teaching described herein, without limitation.

Example 1 is a method of wireless communication at a base station, comprising: transmitting a first DCI portion in a PDCCH, wherein the first DCI portion indicates a second DCI portion; jointly encoding multiple component DCIs, each of the component DCIs providing a resource allocation in combination with the first DCI portion; and transmitting the second DCI portion comprising the jointly encoded multiple component DCIs in a PDSCH.

In Example 2, the method of Example 1 further includes that the each of the multiple component DCIs comprised in the second DCI portion allocates resources for at least one of: a PDSCH transmission, a physical uplink shared channel (PUSCH), a physical uplink control channel (PUCCH), a channel state information reference signal (CSI-RS), or a sounding reference signal (SRS).

In Example 3, the method of Example 1 or Example 2 further includes that the base station jointly encoded the multiple component DCIs with a single CRC.

In Example 4, the method of any of Examples 1-3 further includes that the CRC is scrambled with a joint RNTI.

In Example 5, the method of any of Examples 1-4 further includes that the base station jointly encodes the multiple component DCIs using a single polar code.

In Example 6, the method of any of Examples 1-5 further comprises: positioning each of the component DCIs with zero padding based on a longest DCI length monitored by a UE.

In Example 7, the method of any of Examples 1-6 further includes that the first DCI portion includes an indication of a number of component DCIs that will be sent in the second DCI portion.

In Example 8, the method of any of Examples 1-7 further comprises: padding one or more of the multiple component DCIs based on a DCI length.

In Example 9, the method of any of Examples 1-8 further includes that the DCI length is a longest DCI length monitored by a UE.

In Example 10, the method of any of Examples 1-9 further comprises: transmitting an indication of the DCI length to the UE.

In Example 11, the method of any of Examples 1-10 further includes that the indication of the DCI length is jointly encoded with a beta offset for a coding rate control.

In Example 12, the method of any of Examples 1-11 further comprises: configuring the DCI length for the UE in radio resource control signaling.

In Example 13, the method of any of Examples 1-12 further includes that the second DCI portion includes a header indicating a DCI format and RNTI combination for each of the multiple component DCIs.

In Example 14, the method of any of Examples 1-13 further includes that the second DCI portion does not include one or more types of DCI.

In Example 15, the method of any of Examples 1-14 further includes that the base station excludes from the second DCI portion one or more of a fallback DCI or a non-C-RNTI based DCI.

In Example 16, the method of any of Examples 1-15 further includes that the PDSCH does not include user data.

In Example 17, the method of any of Examples 1-16 further includes that the first DCI portion indicates that the PDSCH does not include the user data.

In Example 18, the method of any of Examples 1-17 further includes that the multiple component DCIs are jointly encoded to form a first codeword, the method further comprising: jointly encoding an additional set of multiple component DCIs to form a second codeword, wherein the second codeword is transmitted with the first codeword in the second DCI portion in the PDSCH.

In Example 19, the method of any of Examples 1-18 further includes that the first codeword and the second codeword are polar encoded and mapped sequentially.

In Example 20, the method of any of Examples 1-19 further includes that the first DCI portion comprises a field with configuration information for the first codeword and the second codeword.

In Example 21, the method of any of Examples 1-20 further includes that the first DCI portion comprises first configuration information for the first codeword and the second DCI portion comprises second configuration information for the second codeword.

In Example 22, the method of any of Examples 1-21 further includes that the first DCI portion comprises configuration information for a codeword formed based on the jointly encoded multiple component DCIs and the second DCI portion comprises an indication that no additional component DCIs are included in the PDSCH.

Example 23 is an apparatus for wireless communication at a base station, comprising: means for transmitting a first DCI portion in a PDCCH; means for jointly encoding multiple component DCIs, each of the component DCIs providing a resource allocation in combination with the first DCI portion; and means for transmitting a second DCI portion comprising the jointly encoded multiple component DCIs in a PDSCH.

In Example 24, the apparatus of Example 23 further comprises means to perform the method of any of claims 2-22.

Example 25 is an apparatus for wireless communication at a base station, comprising: a memory; and at least one processor coupled to the memory, the memory and the at least one processor configured to: transmit a first DCI portion in a PDCCH; jointly encode multiple component DCIs, each of the component DCIs providing a resource allocation in combination with the first DCI portion; and transmit a second DCI portion comprising the jointly encoded multiple component DCIs in a PDSCH.

In Example 26, the apparatus of Example 25 further includes that the memory and the at least one processor are further configured to perform the method of any of claims 2-22.

Example 27 is a non-transitory computer-readable medium storing computer executable code for wireless communication at a base station, the code when executed by a processor cause the processor to perform the method of any of claims 1-22.

Example 28 is a method of wireless communication at a UE, comprising: receiving a first DCI portion in a PDCCH; and receiving a second DCI portion comprising jointly encoded multiple component DCIs in a PDSCH, each of the component DCIs providing a resource allocation in combination with the first DCI portion.

In Example 29, the method of Example 28 further includes that the multiple component DCIs are jointly encoded with a single CRC.

In Example 30, the method of Example 28 or Example 29 further includes that the CRC is scrambled with a joint RNTI.

In Example 31, the method of any of Examples 28-30 further includes that the multiple component DCIs are jointly encoded with a single polar code.

In Example 32, the method of any of Examples 28-31 further includes that the component DCIs is positioned with zero padding based on a longest DCI length monitored by the UE.

In Example 33, the method of any of Examples 28-32 further includes that the first DCI portion in the PDCCH includes an indication of number of component DCIs that will be sent in the second DCI portion.

In Example 34, the method of any of Examples 28-33 further includes that one or more of the multiple component DCIs are padded based on a DCI length.

In Example 35, the method of any of Examples 28-34 further includes that the DCI length is a longest DCI length monitored by the UE.

In Example 36, the method of any of Examples 28-35 further comprises: receiving an indication of the DCI length from a base station.

In Example 37, the method of any of Examples 28-36 further includes that the indication of the DCI length is jointly encoded with a beta offset for a coding rate control.

In Example 38, the method of any of Examples 28-37 further comprises: receiving a configuration of the DCI length in radio resource control signaling.

In Example 39, the method of any of Examples 28-38 further includes that the second DCI portion includes a header indicating a DCI format and RNTI combination for each of the multiple component DCIs.

In Example 40, the method of any of Examples 28-39 further includes that the PDSCH carrying the second DCI portion does not contain user data.

In Example 41, the method of any of Examples 28-40 further includes that the first DCI portion indicates that the PDSCH carrying the second DCI portion does not contain user data.

In Example 42, the method of any of Examples 28-41 further includes that the multiple component DCIs are jointly encoded to form a first codeword, the method further comprising: receiving a second codeword based on a jointly encoded additional set of multiple component DCIs, wherein the second codeword is received with the first codeword in the second DCI portion in the PDSCH.

In Example 43, the method of any of Examples 28-42 further includes that the first codeword and the second codeword are polar encoded and mapped sequentially.

In Example 44, the method of any of Examples 28-43 further includes that the first DCI portion comprises a field with configuration information for the first codeword and the second codeword.

In Example 45, the method of any of Examples 28-44 further includes that the first DCI portion comprises first configuration information for the first codeword and the second DCI portion comprises second configuration information for the second codeword.

In Example 46, the method of any of Examples 28-45 further includes that the first DCI portion comprises configuration information for a codeword formed based on the jointly encoded multiple component DCIs and the second DCI portion comprises an indication that no additional component DCIs are included in the PDSCH.

Example 47 is an apparatus for wireless communication at a UE, comprising: means for receiving a DCI portion in a PDCCH; and means for receiving a second DCI portion comprising jointly encoded multiple component DCIs in a PDSCH, each of the component DCIs providing a resource allocation in combination with the first DCI portion.

In Example 48, the apparatus of Example 47 further comprises means to perform the method of any of claims 29-46.

Example 49 is an apparatus for wireless communication at a UE, comprising: a memory; and at least one processor coupled to the memory, the memory and the at least one processor configured to: receive a DCI portion in a PDCCH; and receive a second DCI portion comprising jointly encoded multiple component DCIs in a PDSCH, each of the component DCIs providing a resource allocation in combination with the first DCI portion.

In Example 50, the apparatus of Example 49 further includes that the memory and the at least one processor are further configured to perform the method of any of claims 28-45.

Example 51 is a non-transitory computer-readable medium storing computer executable code for wireless communication at a UE, the code when executed by a processor cause the processor to perform the method of any of claims 28-46.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication at a base station, comprising:
    transmitting a first downlink control information (DCI) portion in a physical downlink control channel (PDCCH), wherein the first DCI portion indicates a second DCI portion;
    jointly encoding multiple component DCIs with a single cyclic redundancy check (CRC), each of the component DCIs providing a resource allocation in combination with the first DCI portion; and
    transmitting the second DCI portion comprising the jointly encoded multiple component DCIs in a physical downlink shared channel (PDSCH).

2. The method of claim 1, wherein the each of the multiple component DCIs comprised in the second DCI portion allocates resources for at least one of:
    a PDSCH transmission,
    a physical uplink shared channel (PUSCH),
    a physical uplink control channel (PUCCH),
    a channel state information reference signal (CSI-RS), or
    a sounding reference signal (SRS).

3. The method of claim 1, wherein the CRC is scrambled with a joint radio network temporary identifier (RNTI).

4. The method of claim 1, wherein the base station jointly encodes the multiple component DCIs using a single polar code.

5. The method of claim 1, further comprising:
positioning each of the component DCIs with zero padding based on a longest DCI length monitored by a user equipment (UE).

6. The method of claim 1, wherein the first DCI portion includes an indication of a number of component DCIs that will be sent in the second DCI portion.

7. The method of claim 6, further comprising:
padding one or more of the multiple component DCIs based on a DCI length.

8. The method of claim 7, wherein the DCI length corresponds to a longest DCI length monitored by a user equipment (UE).

9. The method of claim 7, further comprising:
transmitting an indication of the DCI length to a user equipment (UE).

10. The method of claim 9, wherein the indication of the DCI length is jointly encoded with a beta offset for a coding rate control.

11. The method of claim 7, further comprising:
configuring the DCI length for a user equipment (UE) in radio resource control signaling.

12. The method of claim 1, wherein the second DCI portion includes a header indicating a DCI format and radio network temporary identifier (RNTI) combination for each of the multiple component DCIs.

13. The method of claim 1, wherein the second DCI portion does not include one or more types of DCI.

14. The method of claim 1, wherein the base station excludes from the second DCI portion one or more of a fallback DCI or a non-cell radio network temporary identifier (C-RNTI) based DCI.

15. The method of claim 1, wherein the PDSCH does not include user data.

16. The method of claim 1, wherein the first DCI portion indicates that the PDSCH does not include user data.

17. A method of wireless communication at a base station, comprising:
transmitting a first downlink control information (DCI) portion in a physical downlink control channel (PDCCH), wherein the first DCI portion indicates a second DCI portion;
jointly encoding multiple component DCIs, each of the component DCIs providing a resource allocation in combination with the first DCI portion, wherein the multiple component DCIs are jointly encoded to form a first codeword;
jointly encoding an additional set of multiple component DCIs to form a second codeword; and
transmitting the second DCI portion comprising the jointly encoded multiple component DCIs in a physical downlink shared channel (PDSCH), wherein the second codeword is transmitted with the first codeword in the second DCI portion in the PDSCH.

18. The method of claim 17, wherein the first codeword and the second codeword are polar encoded and mapped sequentially.

19. The method of claim 17, wherein the first DCI portion comprises a field with configuration information for the first codeword and the second codeword.

20. The method of claim 17, wherein the first DCI portion comprises first configuration information for the first codeword and the second DCI portion comprises second configuration information for the second codeword.

21. A method of wireless communication at a base station, comprising:
transmitting a first downlink control information (DCI) portion in a physical downlink control channel (PDCCH), wherein the first DCI portion indicates a second DCI portion;
jointly encoding multiple component DCIs with a single cyclic redundancy check (CRC), each of the component DCIs providing a resource allocation in combination with the first DCI portion; and
transmitting the second DCI portion comprising the jointly encoded multiple component DCIs in a physical downlink shared channel (PDSCH), wherein the first DCI portion comprises configuration information for a codeword formed based on the jointly encoded multiple component DCIs and the second DCI portion comprises an indication that no additional component DCIs are included in the PDSCH.

22. A method of wireless communication at a user equipment (UE), comprising:
receiving a first downlink control information (DCI) portion in a physical downlink control channel (PDCCH); and
receiving a second DCI portion comprising multiple component DCIs jointly encoded with a single cyclic redundancy check (CRC) in a physical downlink shared channel (PDSCH), each of the component DCIs providing a resource allocation in combination with the first DCI portion.

23. The method of claim 22, wherein the CRC is scrambled with a joint radio network temporary identifier (RNTI).

24. The method of claim 22, wherein the multiple component DCIs are jointly encoded with a single polar code.

25. The method of claim 22, wherein each of the component DCIs is positioned with zero padding based on a longest DCI length monitored by the UE.

26. The method of claim 22, wherein the first DCI portion in the PDCCH includes an indication of number of component DCIs that will be sent in the second DCI portion.

27. The method of claim 26, wherein one or more of the multiple component DCIs are padded based on a DCI length.

28. The method of claim 27, wherein the DCI length is a longest DCI length monitored by the UE.

29. The method of claim 27, further comprising:
receiving a length indication of the DCI length from a base station.

30. The method of claim 29, wherein the indication of the DCI length is jointly encoded with a beta offset for a coding rate control.

31. The method of claim 27, further comprising:
receiving a configuration of the DCI length in radio resource control signaling.

32. The method of claim 22, wherein the second DCI portion includes a header indicating a DCI format and radio network temporary identifier (RNTI) combination for each of the multiple component DCIs.

33. The method of claim 22, wherein the PDSCH carrying the second DCI portion does not contain user data.

34. The method of claim 22, wherein the first DCI portion indicates that the PDSCH carrying the second DCI portion does not contain user data.

35. A method of wireless communication at a user equipment (UE), comprising:
receiving a first downlink control information (DCI) portion in a physical downlink control channel (PDCCH);

receiving a second DCI portion comprising multiple component DCIs in a physical downlink shared channel (PDSCH), each of the component DCIs providing a resource allocation in combination with the first DCI portion, wherein the multiple component DCIs are jointly encoded to form a first codeword; and receiving a second codeword based on a jointly encoded additional set of multiple component DCIs, wherein the second codeword is received with the first codeword in the second DCI portion in the PDSCH.

36. The method of claim 35, wherein the first codeword and the second codeword are polar encoded and mapped sequentially.

37. The method of claim 35, wherein the first DCI portion comprises a field with configuration information for the first codeword and the second codeword.

38. The method of claim 35, wherein the first DCI portion comprises first configuration information for the first codeword and the second DCI portion comprises second configuration information for the second codeword.

39. A method of wireless communication at a user equipment (UE), comprising:

receiving a first downlink control information (DCI) portion in a physical downlink control channel (PDCCH); and receiving a second DCI portion comprising jointly encoded multiple component DCIs in a physical downlink shared channel (PDSCH), each of the component DCIs providing a resource allocation in combination with the first DCI portion, wherein the first DCI portion comprises configuration information for a codeword formed based on the jointly encoded multiple component DCIs and the second DCI portion comprises an indication that no additional component DCIs are included in the PDSCH.

* * * * *